US012677244B2

(12) United States Patent
Manolakos et al.

(10) Patent No.: US 12,677,244 B2
(45) Date of Patent: Jul. 7, 2026

(54) POSITIONING METHODS FOR UPLINK POWER-LIMITED USER EQUIPMENT

(71) Applicant: QUALCOMM Incorporated, San Diego, CA (US)

(72) Inventors: Alexandros Manolakos, Athens (GR); Weimin Duan, San Diego, CA (US); Jay Kumar Sundararajan, San Diego, CA (US); Krishna Kiran Mukkavilli, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/690,220

(22) PCT Filed: Aug. 1, 2022

(86) PCT No.: PCT/US2022/074388
§ 371 (c)(1),
(2) Date: Mar. 7, 2024

(87) PCT Pub. No.: WO2023/044194
PCT Pub. Date: Mar. 23, 2023

(65) Prior Publication Data
US 2025/0008468 A1     Jan. 2, 2025

(30) Foreign Application Priority Data

Sep. 20, 2021     (GR) .............................. 20210100623

(51) Int. Cl.
| | |
|---|---|
| *H04W 64/00* | (2009.01) |
| *H04L 5/00* | (2006.01) |
| *H04W 92/18* | (2009.01) |

(52) U.S. Cl.
CPC ........... *H04W 64/00* (2013.01); *H04L 5/0051* (2013.01); *H04W 92/18* (2013.01)

(58) Field of Classification Search
CPC ..... H04W 64/00; H04W 92/18; H04W 88/04; H04W 16/00; H04L 5/0051; G01S 13/765; G01S 13/876; G01S 7/006; G01S 13/003
(Continued)

(56)     References Cited

U.S. PATENT DOCUMENTS

| | | | |
|---|---|---|---|
| 2018/0132158 A1 | 5/2018 | Tseng et al. | |
| 2022/0086791 A1* | 3/2022 | Cui ....................... | G01S 5/0236 |

(Continued)

OTHER PUBLICATIONS

Dwivedi, "Positioning in 5G networks," arXiv 210203361 Feb. 5, 2021. (Year: 2021).*

(Continued)

*Primary Examiner* — Juan A Torres
(74) *Attorney, Agent, or Firm* — Thien T. Nguyen

(57)     ABSTRACT

Disclosed are techniques for wireless positioning. In an aspect, a user equipment (UE) may send, to a first entity, first information indicating a maximum number of positioning signal transmissions or a maximum power for positioning signal transmissions that the UE can support. The UE may receive, from the first entity, configuration information for changing a positioning mode of the UE to a positioning mode selected from a first positioning mode and a second positioning mode. The UE may perform a positioning operation according to the selected positioning mode. In some aspects, the first positioning mode is a normal positioning mode in which the UE sends UL positioning reference signals to a plurality of TRPS, and the second positioning mode a UL power-limited mode in which the UE sends UL positioning reference signals to only one or a small number of TRPs.

38 Claims, 24 Drawing Sheets

(58) Field of Classification Search
USPC ....... 455/456.1, 422, 440; 340/988; 342/450
See application file for complete search history.

(56) References Cited

U.S. PATENT DOCUMENTS

| | | | |
|---|---|---|---|
| 2022/0308153 A1* | 9/2022 | Fakoorian | H04L 5/0051 |
| 2024/0129089 A1* | 4/2024 | Wang | H04L 5/0051 |
| 2024/0171340 A1* | 5/2024 | Vogedes | H04L 5/0048 |
| 2025/0081142 A1* | 3/2025 | Hasegawa | G01S 19/34 |

OTHER PUBLICATIONS

CATT: "Summary of UE and gNB Measurements for NR Position-ing", R1-1910321, 3GPP TSG RAN WG1 #98bis, FL Summary of NR POS Measurement, 3rd Generation Partnership Project, Mobile Competence Centre, 650. Route Des Lucioles, F-06921 Sophia-Antipolis Cedex, France, vol. RAN WG1. No. Chongqing, China, Oct. 14, 2019-Oct. 18, 2019, Oct. 22, 2019, XP051798586, pp. 1-33, chapter 4.6, chapter 4.9.

European Search Report—EP24207996—Search Authority—Munich—Feb. 17, 2025.
3GPP: "Universal Mobile Telecommunications System, Radio Resource Control, Protocol specification, 3GPP TS 25.331 v16.0.0 Release 16", ETSI Technical Specification, 650, Route Des Lucioles, F-06921 Sophia-Antipolis, France vol. 3GPP RAN, No. V16.0.0, Nov. 20, 2020, 2382 Pages, XP014390017, chapters 8.4.0, 8.4.1.2, 8.4.1.3, 8.6.7.19, 8.6.7.19.1a, 10.3.3.33, 10.3.3.33a, 10.3.7.83-10.3.7.85, 10.3.7.106a.
International Search Report and Written Opinion—PCT/US2022/074388—ISA/EPO—Mar. 17, 2023.
Nokia, et al., "Measurements for NR Positioning", 3GPP Draft, 3GPP TSG RAN WG1 #98, R1-1908348, Measurements for NR Positioning, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051764957, 9 Pages, Chapters 2.1-2.3.
Partial International Search Report—PCT/US2022/074388—ISA/EPO—Dec. 16, 2022.

* cited by examiner

1600

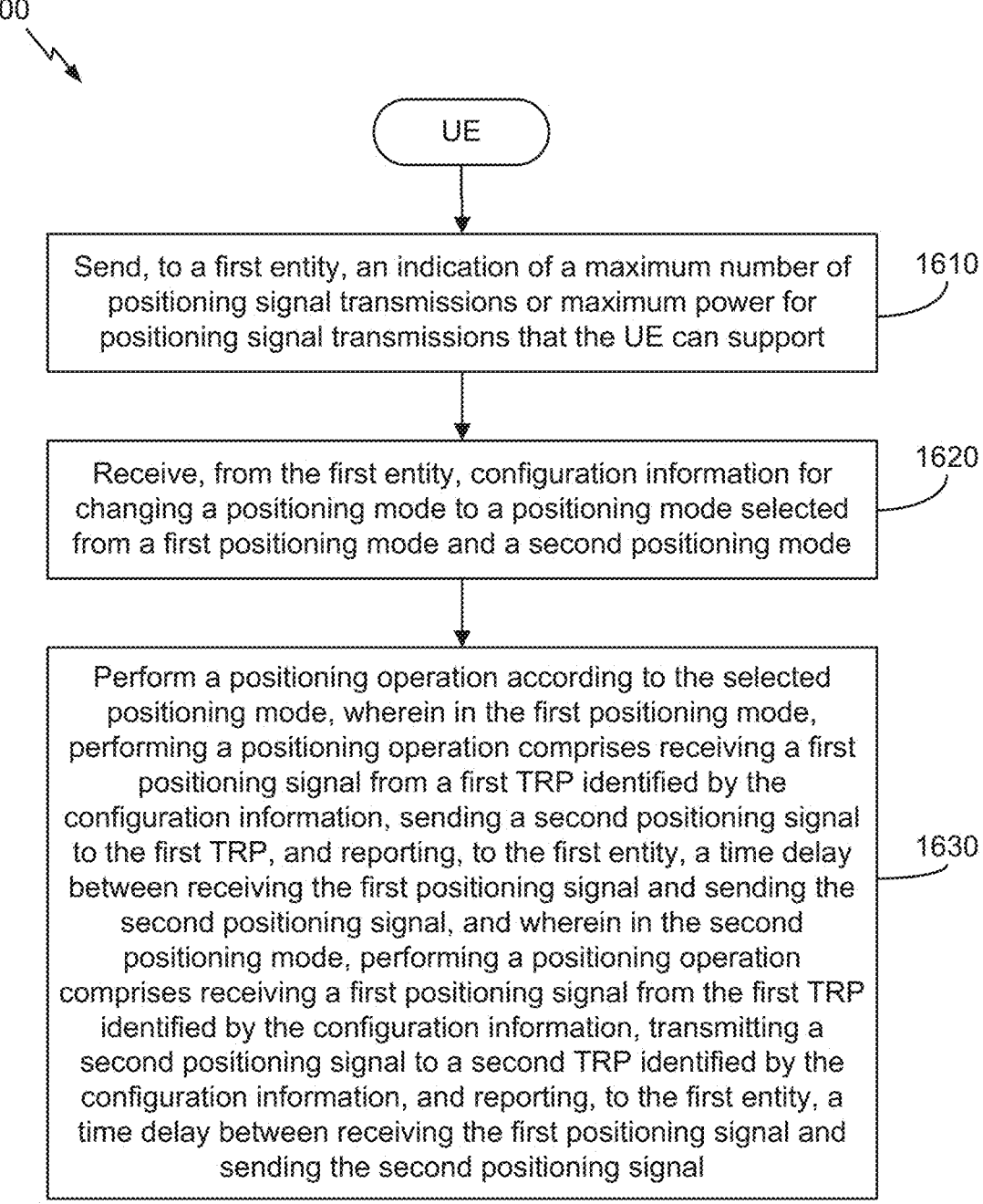

UE

Send, to a first entity, an indication of a maximum number of positioning signal transmissions or maximum power for positioning signal transmissions that the UE can support

1610

Receive, from the first entity, configuration information for changing a positioning mode to a positioning mode selected from a first positioning mode and a second positioning mode

1620

Perform a positioning operation according to the selected positioning mode, wherein in the first positioning mode, performing a positioning operation comprises receiving a first positioning signal from a first TRP identified by the configuration information, sending a second positioning signal to the first TRP, and reporting, to the first entity, a time delay between receiving the first positioning signal and sending the second positioning signal, and wherein in the second positioning mode, performing a positioning operation comprises receiving a first positioning signal from the first TRP identified by the configuration information, transmitting a second positioning signal to a second TRP identified by the configuration information, and reporting, to the first entity, a time delay between receiving the first positioning signal and sending the second positioning signal

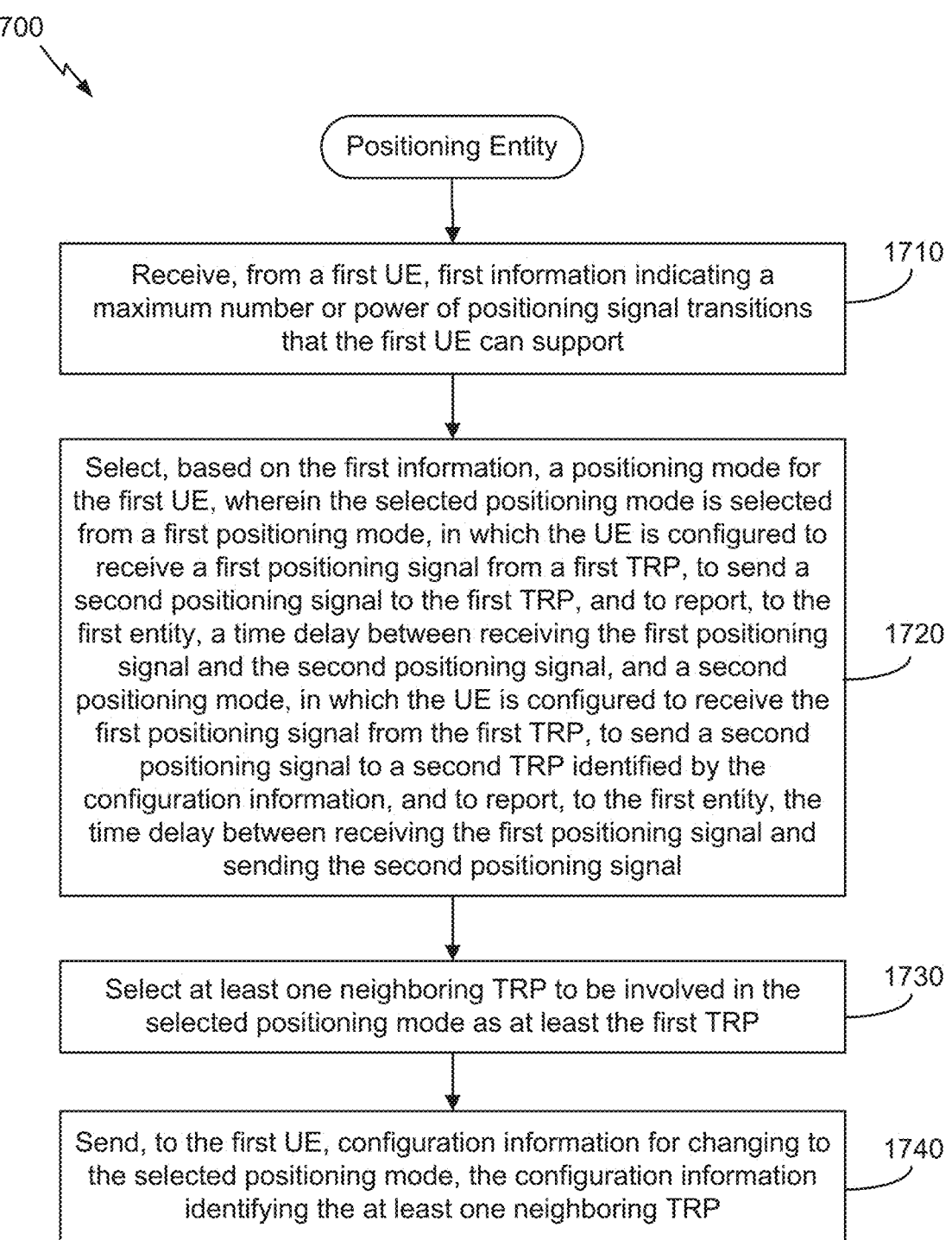

Positioning Entity

Receive, from a first UE, first information indicating a maximum number or power of positioning signal transitions that the first UE can support — 1710

Select, based on the first information, a positioning mode for the first UE, wherein the selected positioning mode is selected from a first positioning mode, in which the UE is configured to receive a first positioning signal from a first TRP, to send a second positioning signal to the first TRP, and to report, to the first entity, a time delay between receiving the first positioning signal and the second positioning signal, and a second positioning mode, in which the UE is configured to receive the first positioning signal from the first TRP, to send a second positioning signal to a second TRP identified by the configuration information, and to report, to the first entity, the time delay between receiving the first positioning signal and sending the second positioning signal — 1720

Select at least one neighboring TRP to be involved in the selected positioning mode as at least the first TRP — 1730

Send, to the first UE, configuration information for changing to the selected positioning mode, the configuration information identifying the at least one neighboring TRP — 1740

POSITIONING METHODS FOR UPLINK POWER-LIMITED USER EQUIPMENT

CROSS-REFERENCE TO RELATED APPLICATIONS

The present Application for Patent claims the benefit of GR application Ser. No. 20210100623, entitled "POSITIONING METHODS FOR UPLINK POWER-LIMITED USER EQUIPMENT", filed Sep. 20, 2021, and is a national stage application, filed under 35 U.S.C. § 371, of International Patent Application No. PCT/US2022/074388, entitled, "POSITIONING METHODS FOR UPLINK POWER-LIMITED USER EQUIPMENT", filed Aug. 1, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes sending, to a first entity, first information indicating a maximum number of positioning signal transmissions that the UE can support, a maximum power for positioning signal transmissions that the UE can support, or both; receiving, from the first entity, configuration information for changing a positioning mode of the UE to a selected positioning mode selected from a first positioning mode and a second positioning mode; and performing a positioning operation according to the selected positioning mode, wherein in the first positioning mode, performing the positioning operation comprises receiving a first positioning signal from a first transmission/reception point (TRP) identified by the configuration information, sending a second positioning signal to the first TRP, and reporting, to the first entity, a time delay between receiving the first positioning signal and sending the second positioning signal, and wherein in the second positioning mode, performing the positioning operation comprises receiving the first positioning signal from the first TRP identified by the configuration information, sending a second positioning signal to a second TRP identified by the configuration information, and reporting, to the first entity, the time delay between receiving the first positioning signal and sending the second positioning signal.

In an aspect, a method of wireless positioning performed by a positioning entity includes receiving, from a first user equipment (UE), first information indicating a maximum number of positioning signal transmissions that the first UE can support, a maximum power for positioning signal transmissions that the first UE can support, or both; selecting, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal; selecting at least one neighboring TRP to be involved in the selected positioning mode as at least the first TRP; and sending, to the first UE, configuration information for changing a positioning mode of the UE to the selected positioning mode, the configuration information identifying the at least one neighboring TRP.

In an aspect, a method of wireless positioning performed by a first network entity includes determining that a first positioning signal transmitted by a target UE does not meet a threshold requirement; and sending, to a second network entity that serves the target UE, a first message, wherein the first message indicates that positioning signals transmitted by the target UE do not meet the threshold requirement, requests the second network entity to configure itself to receive and measure positioning signals transmitted by the first network entity, or both.

In an aspect, a user equipment (UE) includes a memory; at least one transceiver; and at least one processor communicatively coupled to the memory and the at least one transceiver, the at least one processor configured to: send, via the at least one transceiver, to a first entity, first information indicating a maximum number of positioning signal transmissions that the UE can support, a maximum power for positioning signal transmissions that the UE can support, or both; receive, via the at least one transceiver, from the first entity, configuration information for changing a positioning mode of the UE to a selected positioning mode selected from a first positioning mode and a second positioning mode; and perform a positioning operation according to the selected positioning mode, wherein in the first positioning mode, the at least one processor is configured to receive a first positioning signal from a first transmission/reception point (TRP) identified by the configuration information, send a second positioning signal to the first TRP, and report, to the first entity, a time delay between receiving the first positioning signal and sending the second positioning signal, and wherein in the second positioning mode, the at least one processor is configured to receive the first positioning signal from the first TRP identified by the configuration information, send a second positioning signal to a second TRP identified by the configuration information, and report, to the first entity, the time delay between receiving the first positioning signal and sending the second positioning signal.

In an aspect, a positioning entity includes a memory; at least one transceiver; and at least one processor communicatively coupled to the memory and the at least one transceiver, the at least one processor configured to: receive, via the at least one transceiver, from a first user equipment (UE), first information indicating a maximum number of positioning signal transmissions that the UE can support, a maximum power for positioning signal transmissions that the first UE can support, or both; select, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal; select at least one neighboring TRP to be involved in the selected positioning mode as at least the first TRP; and send, via the at least one transceiver, to the first UE, configuration information for changing a positioning mode of the UE to the selected positioning mode, the configuration information identifying the at least one neighboring TRP.

In an aspect, a first network entity includes a memory; at least one transceiver; and at least one processor communicatively coupled to the memory and the at least one transceiver, the at least one processor configured to: determine that a first positioning signal transmitted by a target UE does not meet a threshold requirement; and send, via the at least one transceiver, to a second network entity that serves the target UE, a first message, wherein the first message indicates that positioning signals transmitted by the target UE do not meet the threshold requirement, requests the second network entity to configure itself to receive and measure positioning signals transmitted by the first network entity, or both.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 16 to 18 are flowcharts illustrating methods of wireless positioning, according to aspects of the disclosure.

DETAILED DESCRIPTION

Figure 1:
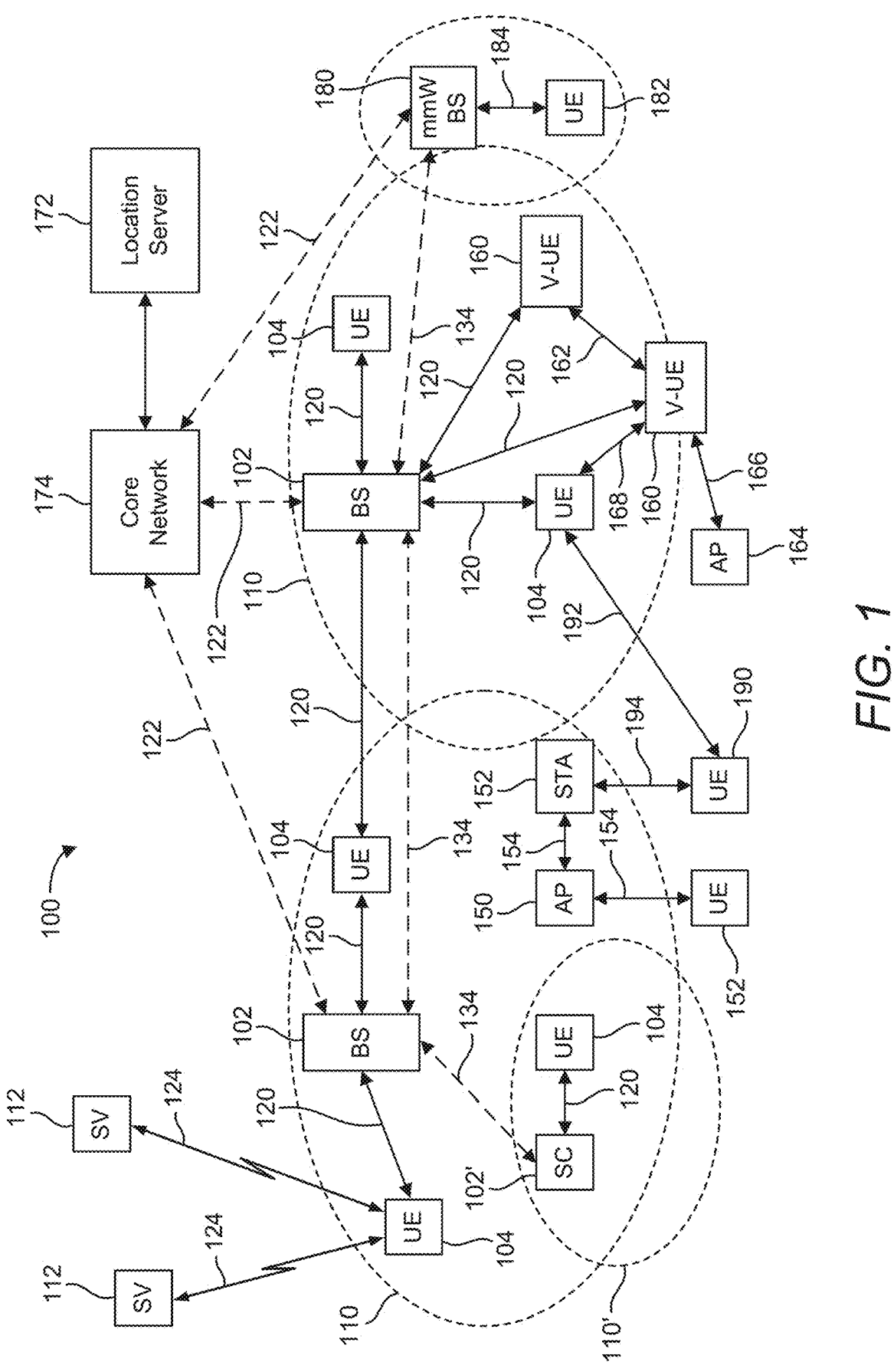
FIG. 1 illustrates an example wireless communications system, according to aspects of the disclosure.

Disclosed are techniques for wireless positioning. In an aspect, a user equipment (UE) may send, to a first entity, first information indicating a maximum number of positioning signal transmissions or a maximum power for positioning signal transmissions that the UE can support. The UE may receive, from the first entity, configuration information for changing a positioning mode of the UE to a positioning mode selected from a first positioning mode and a second positioning mode. The UE may perform a positioning operation according to the selected positioning mode. In some aspects, the first positioning mode is a normal positioning mode in which the UE sends UL positioning reference signals to a plurality of TRPS, and the second positioning mode is a UL power-limited mode in which the UE sends UL positioning reference signals to only one or a small number of TRPs.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.). Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a beads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages. NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier." "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems. TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1. UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
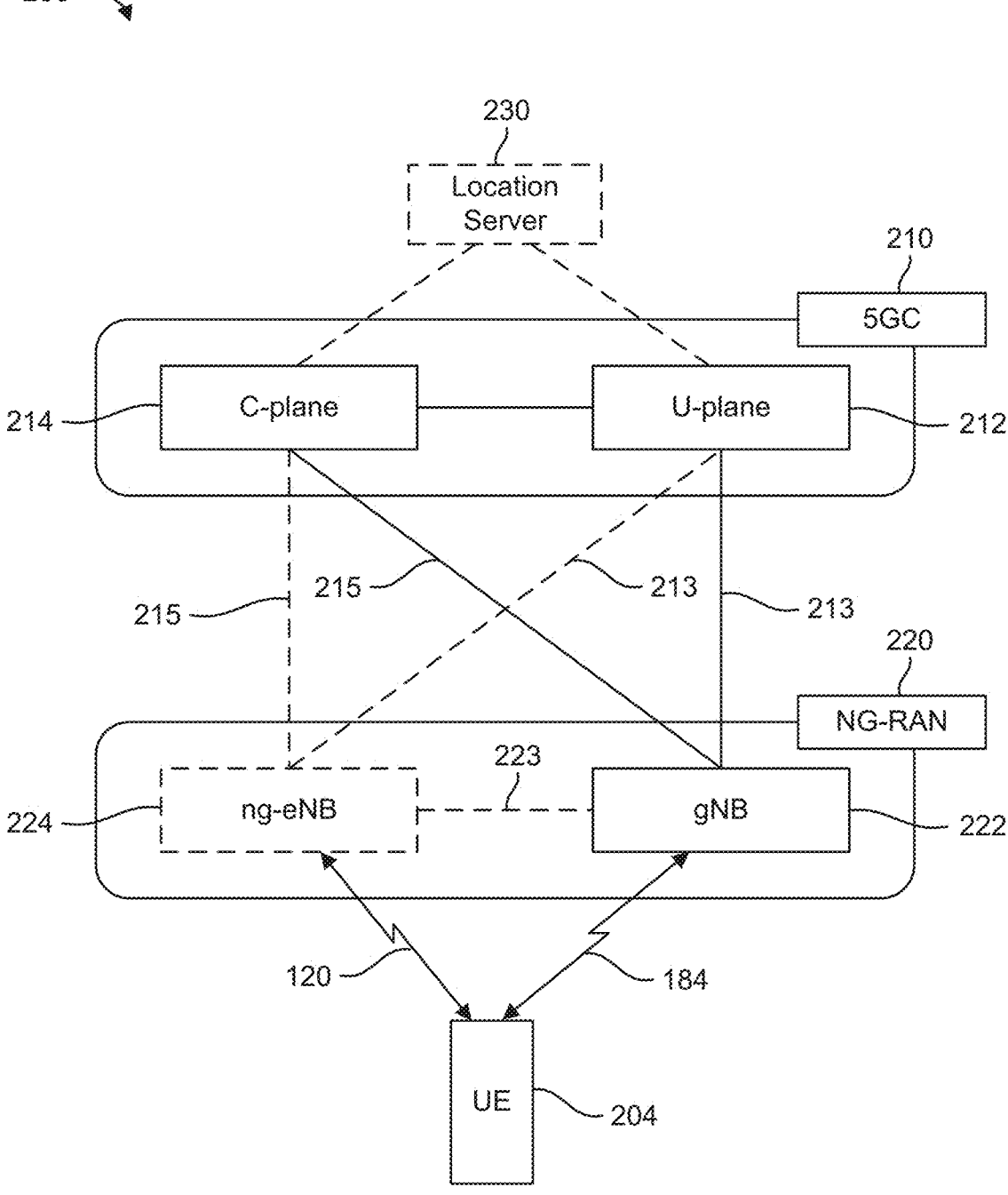
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
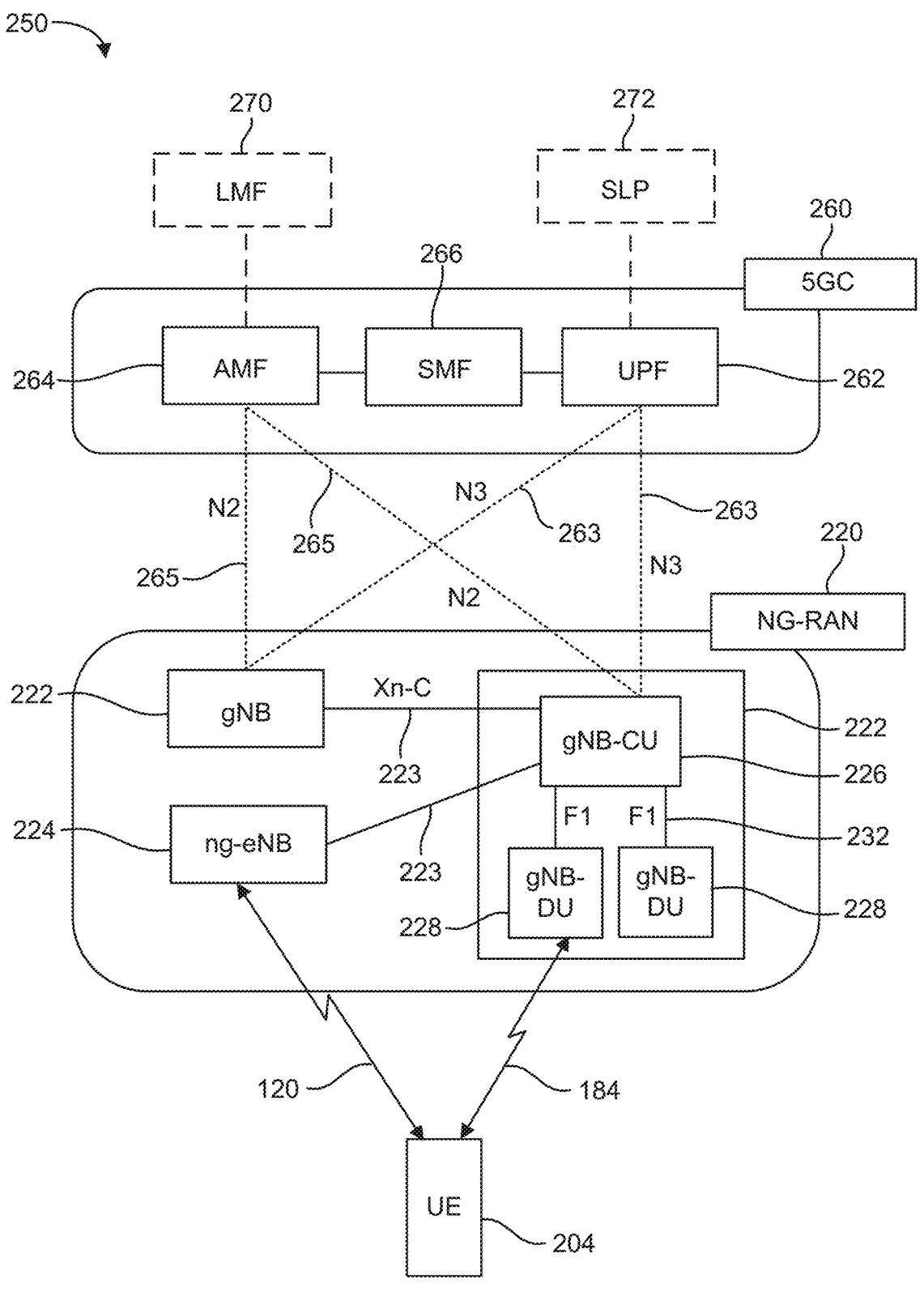

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
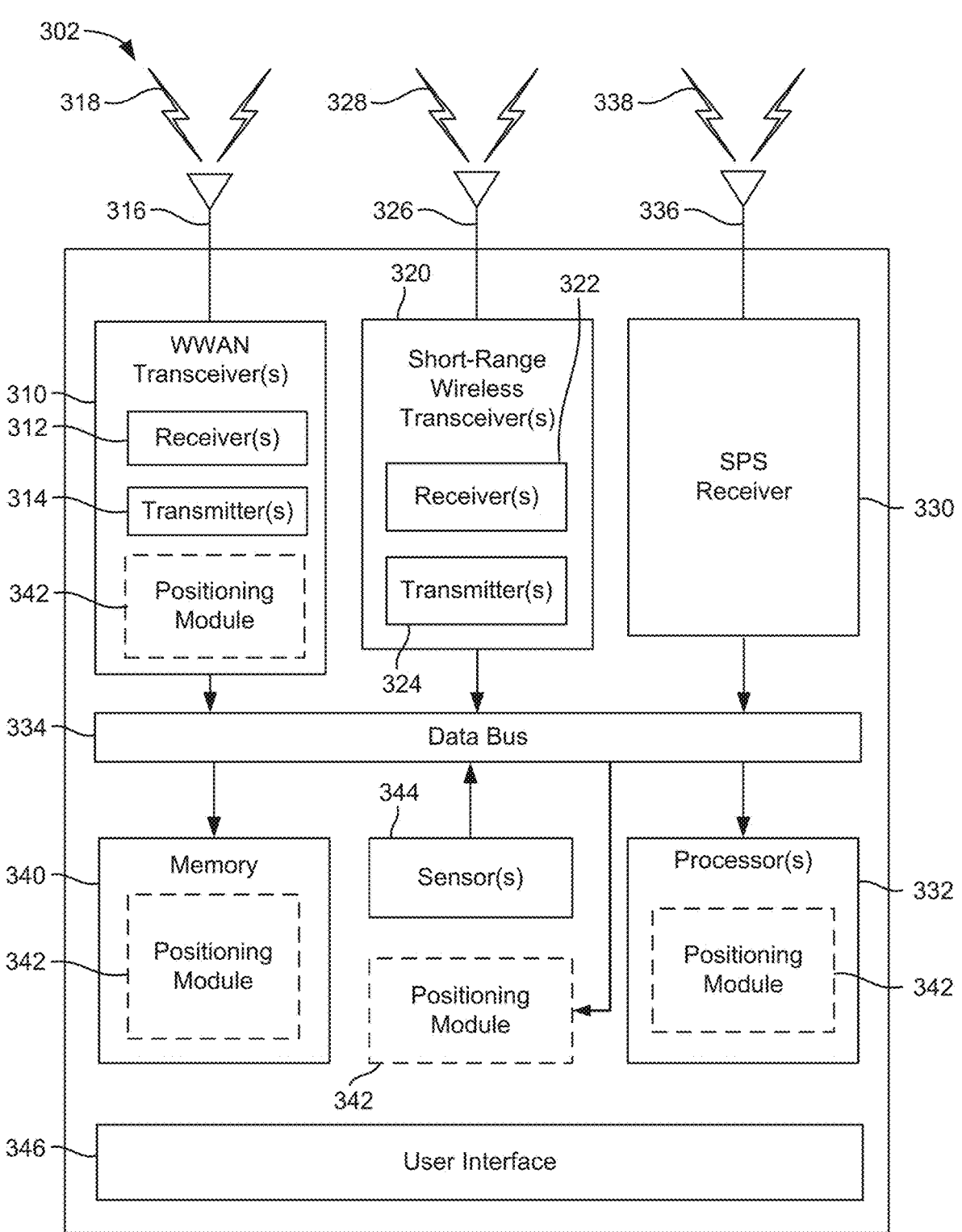
FIGS. 3A, 3B, and 3C are simplified block diagrams of several sample aspects of components that may be employed in a user equipment (UE), a base station, and a network entity, respectively, and configured to support communications as taught herein.
Figure 3B:
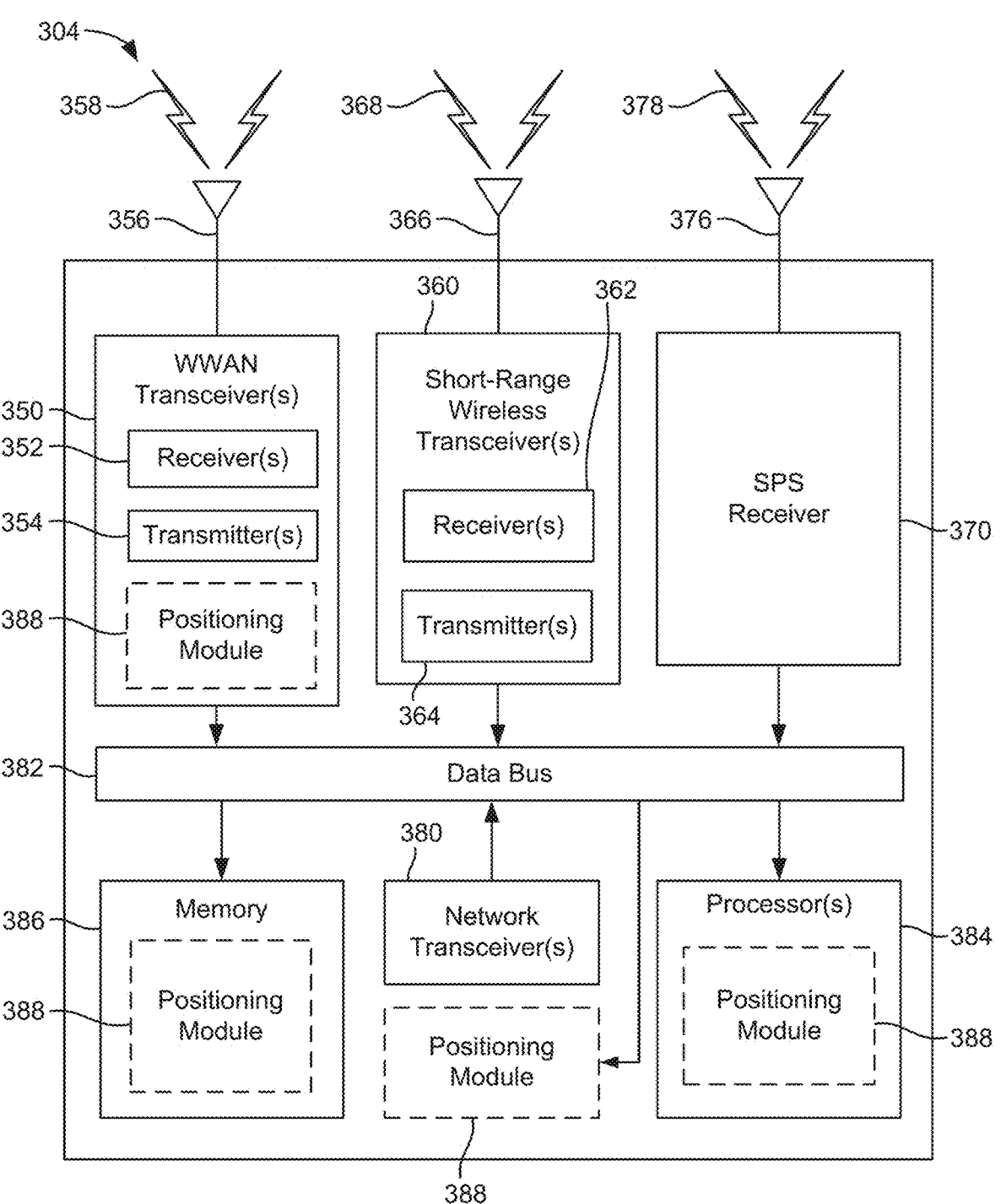
Figure 3C:
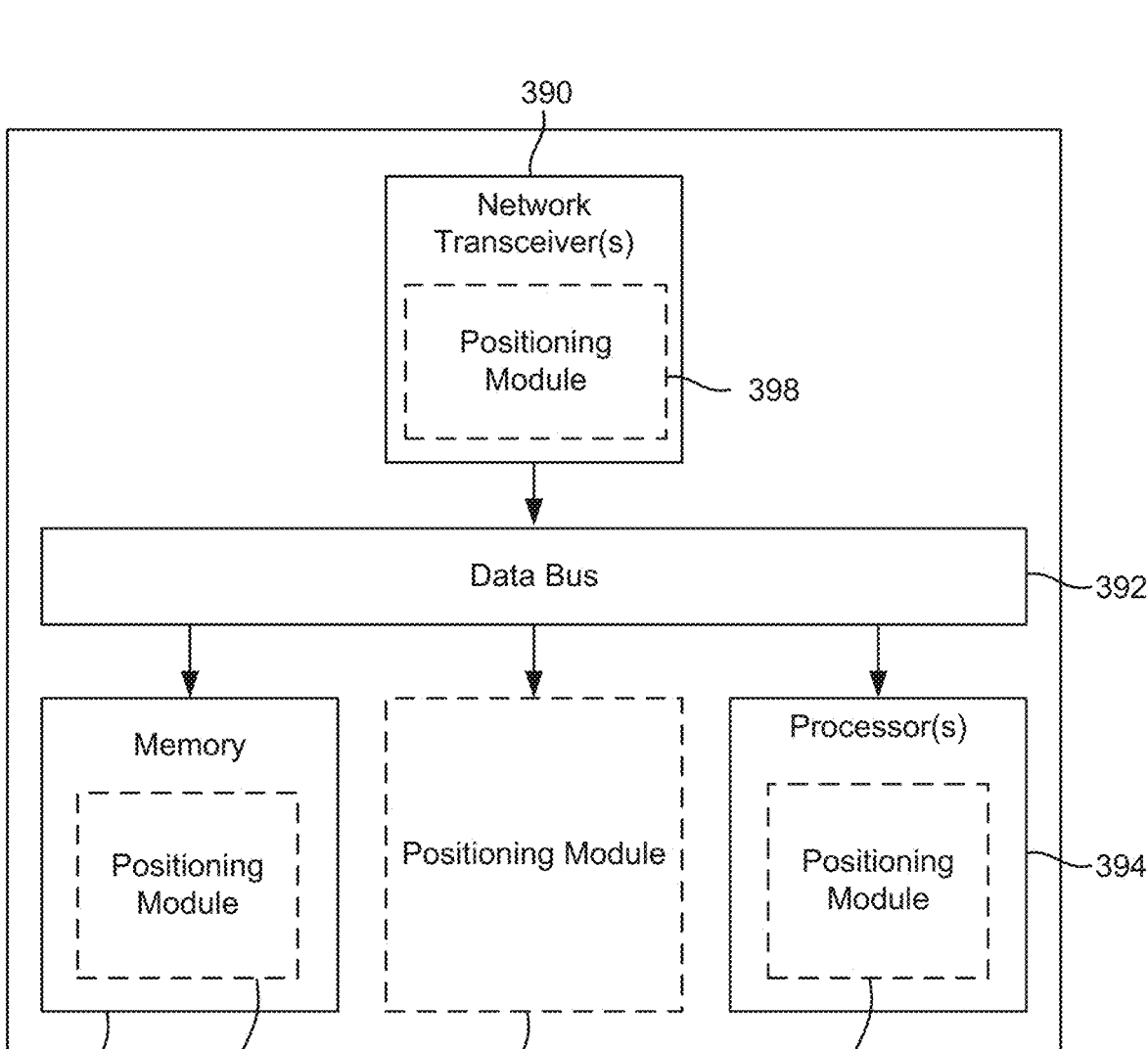

FIG. 3A, FIG. 3B, and FIG. 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the network transceiver 380 to communicate with other base stations 304 or network entities 306 over one or more wired or wireless backhaul links. As another example, the network entity 306 may employ the network transceiver 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver." "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning modules 342, 388, and 398, respectively. The positioning modules 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning modules 342, 388, and 398 may be external to the processors 332, 384, and 394 (e.g., part of a modem processing system, integrated with another processing system, etc.). Alternatively, the positioning modules 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning module 342, which may be, for example, part of the WWAN transceiver 310, the memory 340, the processor 332, or any combination thereof, or may be a standalone component. FIG. 3B illustrates possible locations of the positioning module 388, which may be, for example, part of the WWAN transceiver 350, the memory 386, the processor 384, or any combination thereof, or may be a standalone component. FIG. 3C illustrates possible locations of the positioning module 398, which may be, for example, part of the network transceiver 390, the memory 396, the processor 394, or any combination thereof, or may be a standalone component.

The UE 302 may include one or more sensors 344 coupled to the processor 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processor 384 in more detail, in the downlink, IP packets from the network entity 306 may be provided to the processor 384. The processor 384 may implement functionality for an RRC layer, a packet data convergence protocol (PDCP) layer, a radio link control (RLC) layer, and a medium access control (MAC) layer. The processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processor 332, which implements Layer-3 (L3) and Layer-2 (L2) functionality.

In the uplink, the processor 332 provides demultiplexing between transport and logical channels, packet reassembly, deciphering, header decompression, and control signal processing to recover IP packets from the core network. The processor 332 is also responsible for error detection.

Similar to the functionality described in connection with the downlink transmission by the base station 304, the processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processor 384.

In the uplink, the processor 384 provides demultiplexing between transport and logical channels, packet reassembly, deciphering, header decompression, control signal processing to recover IP packets from the UE 302. IP packets from the processor 384 may be provided to the core network. The processor 384 is also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs.

The various components of the UE 302, the base station 304, and the network entity 306 may communicate with each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A. 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity." etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning modules 342, 388, and 398, etc.

In some aspects, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
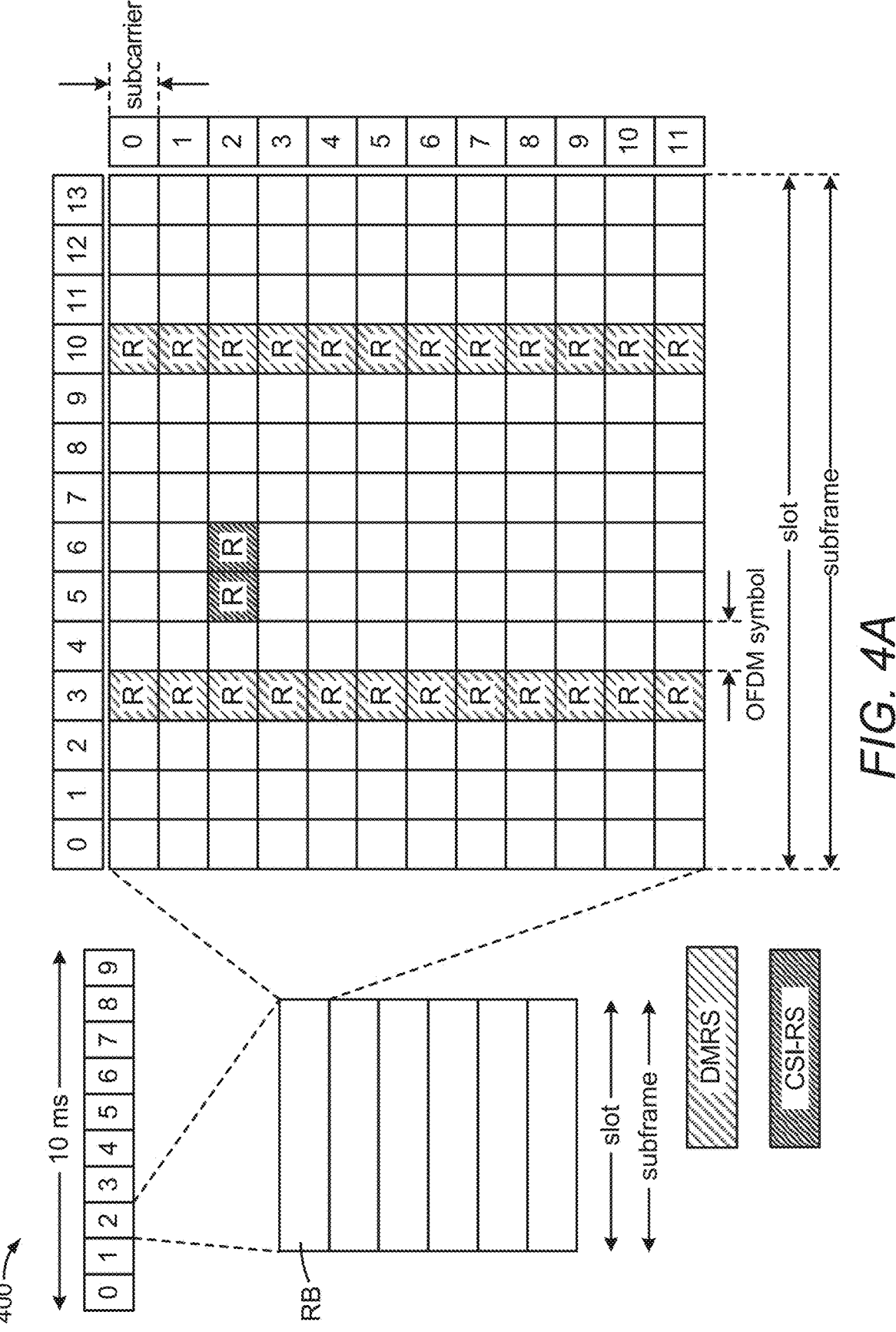
FIGS. 4A and 4B are diagrams illustrating examples of frame structures and channels within the frame structures, according to aspects of the disclosure.
Figure 4B:
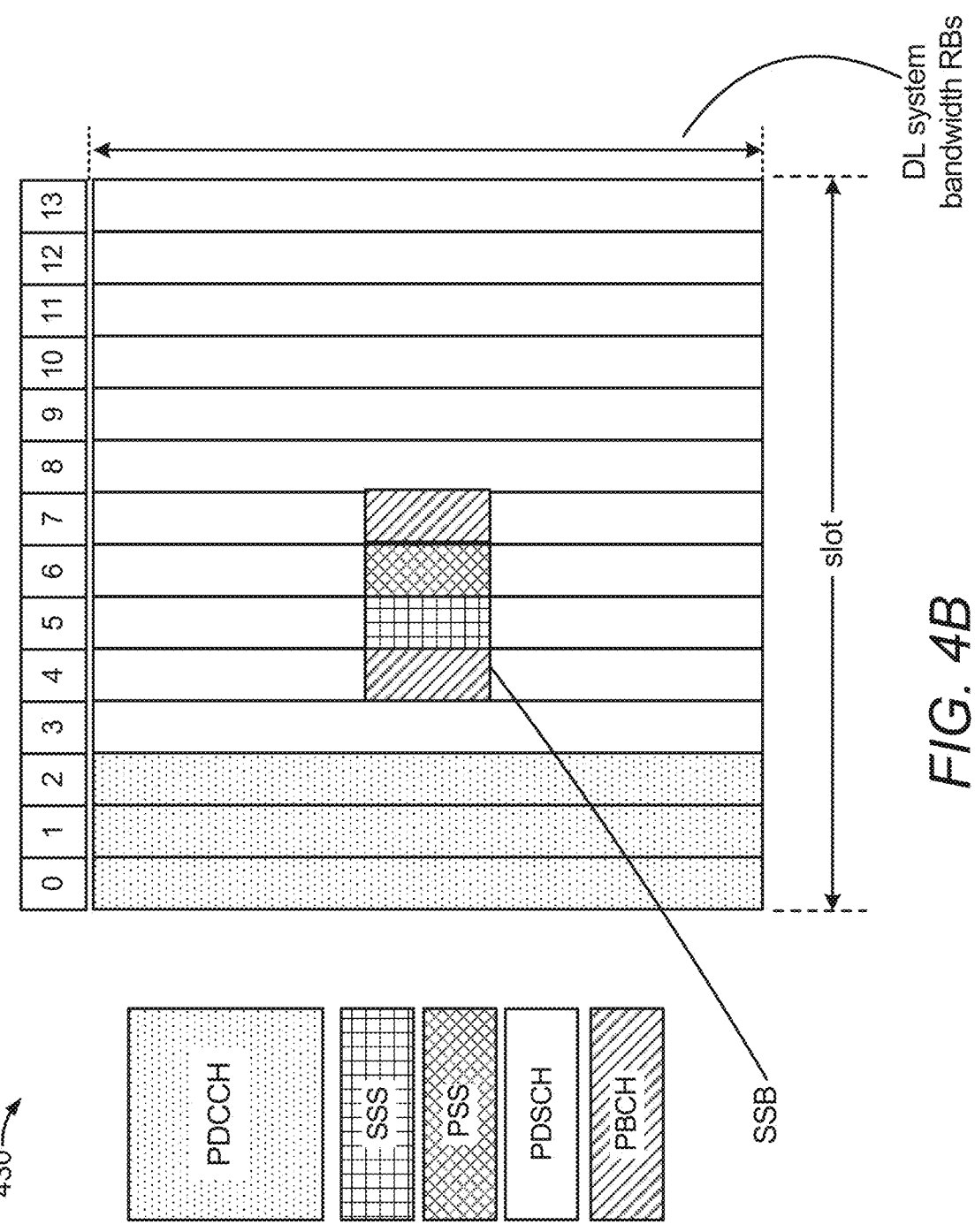

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well, OFDM and SC-FDM partition the system bandwidth into multiple (K)

orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz. 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 200 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages. In some cases, the DL RS illustrated in FIG. 4A may be positioning reference signals (PRS).

Figure 5:
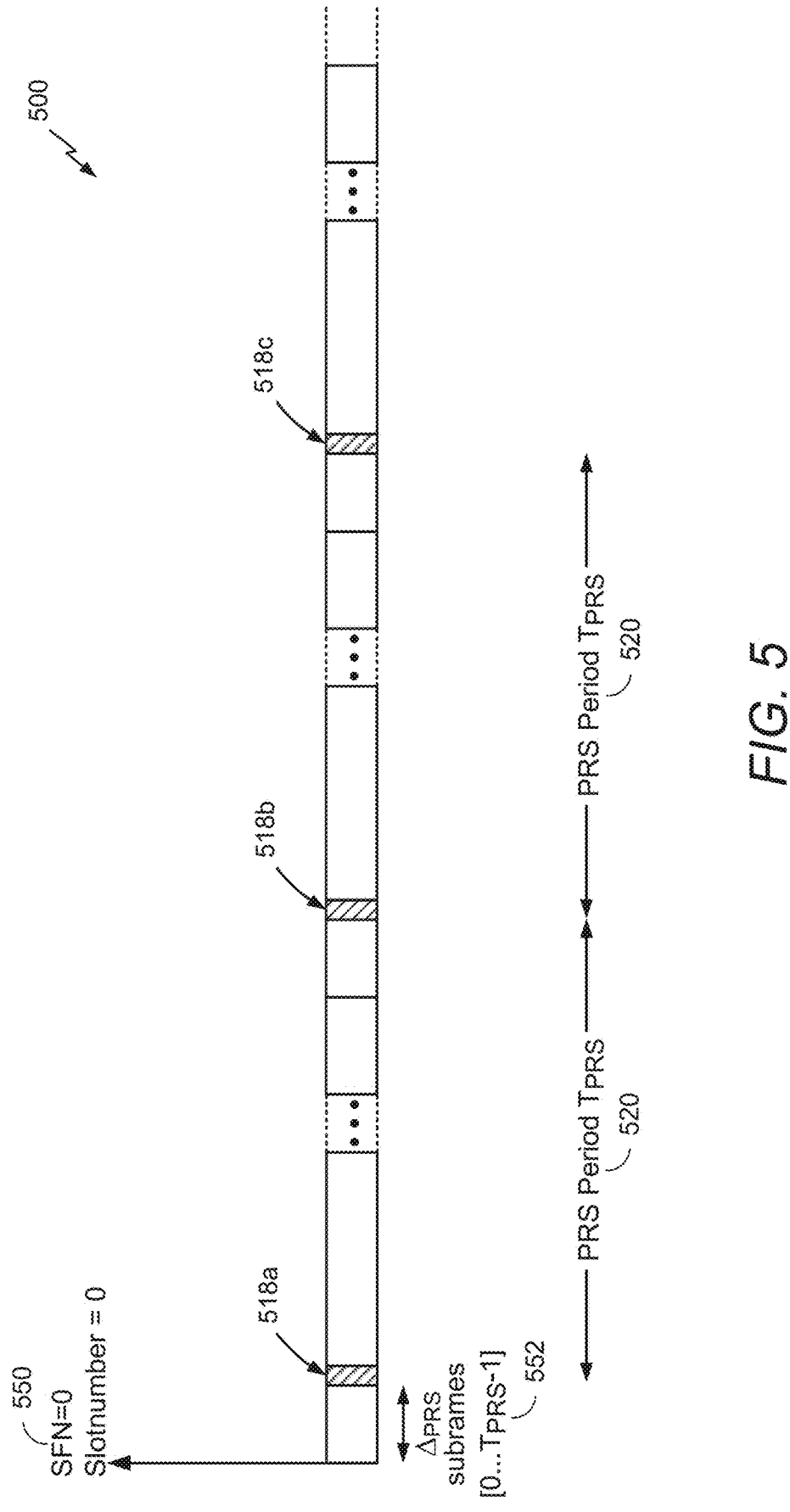
FIG. 5 illustrates an exemplary PRS configuration for a cell supported by a wireless node.

FIG. 5 illustrates an exemplary PRS configuration 500 for a cell supported by a wireless node (such as a base station 102). FIG. 5 shows how PRS positioning occasions are determined by a system frame number (SFN), a cell specific subframe offset ($\Delta_{PRS}$) 552, and the PRS periodicity ($T_{PRS}$) 520. Typically, the cell specific PRS subframe configuration is defined by a "PRS Configuration Index" $I_{PRS}$ included in observed time difference of arrival (OTDOA) assistance data. The PRS periodicity ($T_{PRS}$) 520 and the cell specific subframe offset ($\Delta_{PRS}$) are defined based on the PRS configuration index $I_{PRS}$, as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS configuration is defined with reference to the SFN of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell specific subframe offset $\Delta_{PRS}$ 552 may be defined in terms of the number of subframes transmitted starting from system frame number 0 (Slot 'Number 0', marked as slot 550) to the start of the first (subsequent) PRS positioning occasion. In the example in FIG. 5, the number of consecutive positioning subframes (NPRs) in each of the consecutive PRS positioning occasions 518a, 518b, and 518c equals 4. That is, each shaded block representing PRS positioning occasions 518a, 518b, and 518c represents four subframes.

In some aspects, when a UE receives a PRS configuration index $I_{PRS}$ in the OTDOA assistance data for a particular cell, the UE may determine the PRS periodicity $T_{PRS}$ 520 and PRS subframe offset $\Delta_{PRS}$ using Table 2. The UE may then determine the radio frame, subframe, and slot when a PRS is scheduled in the cell (e.g., using equation (1)). The OTDOA assistance data may be determined by, for example, the location server (e.g., location server 230, LMF 270), and includes assistance data for a reference cell, and a number of neighbor cells supported by various base stations.

Typically, PRS occasions from all cells in a network that use the same frequency are aligned in time and may have a fixed known time offset (e.g., cell-specific subframe offset 552) relative to other cells in the network that use a different frequency. In SFN-synchronous networks, all wireless nodes (e.g., base stations 102) may be aligned on both frame boundary and system frame number. Therefore, in SFN-synchronous networks, all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE may determine the timing of the PRS occasions of the reference and neighbor cells for OTDOA positioning, if the UE can obtain the cell timing (e.g., SFN) of at least one of the cells, e.g., the reference cell or a serving cell. The timing of the other cells may then be derived by the UE based, for example, on the assumption that PRS occasions from different cells overlap.

A collection of resource elements that are used for transmission of PRS is referred to as a "PRS resource." The collection of resource elements can span multiple PRBs in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). In some aspects, one antenna port is supported. The comb size indicates the number of subcarriers in each symbol carrying PRS. For example, a comb-size of comb-4 means that every fourth subcarrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource ID in a PRS resource set is associated with a single beam transmitted from a single TRP (where a TRP may transmit one or more beams). That is, each PRS resource of a PRS resource set may be transmitted on a different beam, and as such, a "PRS resource" can also be referred to as a "beam." Note that this does not have any implications on whether the TRPs and the beams on which PRS are transmitted are known to the UE. A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE or NR systems. However, as used herein, unless otherwise indicated, the terms "positioning reference signal" and "PRS" refer to any type of reference signal that can be used for positioning, such as but not limited to, PRS signals in LTE or NR, navigation reference signals (NRSs) in 5G, transmitter reference signals (TRSs), cell-specific reference signals (CRSs), channel state information reference signals (CSI-RSs), primary synchronization signals (PSSs), secondary synchronization signals (SSSs), SSB, etc.

An SRS is an uplink-only signal that a UE transmits to help the base station obtain the channel state information (CSI) for each user. Channel state information describes how an RF signal propagates from the UE to the base station and represents the combined effect of scattering, fading, and power decay with distance. The system uses the SRS for resource scheduling, link adaptation, massive MIMO, beam management, etc.

Several enhancements over the previous definition of SRS have been proposed for SRS for positioning (SRS-P), such as a new staggered pattern within an SRS resource, a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a DL RS from a neighboring TRP. Further still, one SRS resource may be transmitted outside the active bandwidth part (BWP), and one SRS resource may span across multiple component carriers. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or downlink control information (DCI)).

As noted above, SRSs in NR are UE-specifically configured reference signals transmitted by the UE used for the purposes of the sounding the uplink radio channel. Similar to CSI-RS, such sounding provides various levels of knowledge of the radio channel characteristics. On one extreme, the SRS can be used at the gNB simply to obtain signal strength measurements, e.g., for the purposes of UL beam management. On the other extreme, SRS can be used at the gNB to obtain detailed amplitude and phase estimates as a function of frequency, time, and space. In NR, channel sounding with SRS supports a more diverse set of use cases compared to LTE (e.g., downlink CSI acquisition for reciprocity-based gNB transmit beamforming (downlink MIMO); uplink CSI acquisition for link adaptation and codebook/non-codebook based precoding for uplink MIMO, uplink beam management, etc.).

The SRS can be configured using various options. The time/frequency mapping of an SRS resource is defined by the following characteristics.

Time duration $N_{symb}^{SRS}$—The time duration of an SRS resource can be 1, 2, or 4 consecutive OFDM symbols within a slot, in contrast to LTE which allows only a single OFDM symbol per slot.

Starting symbol location $l_0$—The starting symbol of an SRS resource can be located anywhere within the last 6 OFDM symbols of a slot provided the resource does not cross the end-of-slot boundary.

Repetition factor R—For an SRS resource configured with frequency hopping, repetition allows the same set of subcarriers to be sounded in R consecutive OFDM symbols before the next hop occurs (as used herein, a "hop" refers to specifically to a frequency hop). For example, values of Rare 1, 2, 4 where $R \leq N_{symb}^{SRS}$.

Transmission comb spacing $K_{TC}$ and comb offset $k_{TC}$—An SRS resource may occupy resource elements (REs) of a frequency domain comb structure, where the comb spacing is either 2 or 4 REs like in LTE. Such a structure allows frequency domain multiplexing of different SRS resources of the same or different users on different combs, where the different combs are offset from each other by an integer number of REs. The comb offset is defined with respect to a PRB boundary, and can take values in the range 0, 1, . . . , $K_{TC}-1$ REs. Thus, for comb spacing $K_{TC}=2$, there are 2 different combs available for multiplexing if needed, and for comb spacing $K_{TC}=4$, there are 4 different available combs.

Periodicity and slot offset for the case of periodic/semi-persistent SRS.

Sounding bandwidth within a bandwidth part.

For low latency positioning, a gNB may trigger a UL SRS-P via a DCI (e.g., transmitted SRS-P may include repetition or beam-sweeping to enable several gNBs to receive the SRS-P). Alternatively, the gNB may send information regarding aperiodic PRS transmission to the UE (e.g., this configuration may include information about PRS from multiple gNBs to enable the UE to perform timing computations for positioning (UE-based) or for reporting (UE-assisted). While various embodiments of the present disclosure relate to DL PRS-based positioning procedures, some or all of such embodiments may also apply to UL SRS-P-based positioning procedures.

Note that the terms "sounding reference signal", "SRS" and "SRS-P" may sometimes refer to specific reference signals that are used for positioning in LTE or NR systems. However, as used herein, unless otherwise indicated, the terms "sounding reference signal", "SRS" and "SRS-P" refer to any type of reference signal that can be used for positioning, such as but not limited to, SRS signals in LTE or NR, navigation reference signals (NRSs) in 5G, transmitter reference signals (TRSs), random access channel (RACH) signals for positioning (e.g., RACH preambles, such as Msg-1 in 4-Step RACH procedure or Msg-A in 2-Step RACH procedure), etc.

3GPP Rel. 16 introduced various NR positioning aspects directed to increase location accuracy of positioning schemes that involve measurement(s) associated with one or more UL or DL PRSs (e.g., higher bandwidth (BW), FR2 beam-sweeping, angle-based measurements such as Angle of Arrival (AoA) and Angle of Departure (AoD) measurements, multi-cell Round-Trip Time (RTT) measurements, etc.). If latency reduction is a priority, then UE-based positioning techniques (e.g., DL-only techniques without UL location measurement reporting) are typically used. However, if latency is less of a concern, then UE-assisted positioning techniques can be used, whereby UE-measured data is reported to a network entity (e.g., location server 230, LMF 270, etc.). Latency associated UE-assisted positioning techniques can be reduced somewhat by implementing the LMF in the RAN.

Layer-3 (L3) signaling (e.g., RRC or Location Positioning Protocol (LPP)) is typically used to transport reports that comprise location-based data in association with UE-assisted positioning techniques. L3 signaling is associated with relatively high latency (e.g., above 100 ms) compared with Layer-1 (L1, or PHY layer) signaling or Layer-2 (L2, or MAC layer) signaling. In some cases, lower latency (e.g., less than 100 ms, less than 10 ms, etc.) between the UE and the RAN for location-based reporting may be desired. In such cases, L3 signaling may not be capable of reaching these lower latency levels. L3 signaling of positioning measurements may comprise any combination of the following:

One or multiple TOA, TDOA, RSRP or Rx-Tx measurements,

One or multiple AoA/AoD (e.g., currently agreed only for gNB→LMF reporting DL AoA and UL AoD) measurements, One or multiple Multipath reporting measurements, e.g., per-path ToA, RSRP, AoA/AoD (e.g., currently only per-path ToA allowed in LTE)

One or multiple motion states (e.g., walking, driving, etc.) and trajectories (e.g., currently for UE), and/or One or multiple report quality indications.

More recently, L1 and L2 signaling has been contemplated for use in association with PRS-based reporting. For example, L1 and L2 signaling is currently used in some systems to transport CSI reports (e.g., reporting of Channel Quality Indications (CQIs), Precoding Matrix Indicators (PMIs), Layer Indicators (Lis), L1-RSRP, etc.). CSI reports may comprise a set of fields in a pre-defined order (e.g., defined by the relevant standard). A single UL transmission (e.g., on PUSCH or PUCCH) may include multiple reports, referred to herein as 'sub-reports', which are arranged according to a pre-defined priority (e.g., defined by the relevant standard). In some aspects, the pre-defined order may be based on an associated sub-report periodicity (e.g., aperiodic/semi-persistent/periodic (A/SP/P) over PUSCH/PUCCH), measurement type (e.g., L1-RSRP or not), serving cell index (e.g., in carrier aggregation (CA) case), and reportconfigID. With 2-part CSI reporting, the part 1s of all reports are grouped together, and the part 2s are grouped separately, and each group is separately encoded (e.g., part 1 payload size is fixed based on configuration parameters, while part 2 size is variable and depends on configuration parameters and also on associated part 1 content). A number of coded bits/symbols to be output after encoding and rate-matching is computed based on a number of input bits and beta factors, per the relevant standard. Linkages (e.g., time offsets) are defined between instances of RSs being measured and corresponding reporting. In some aspects, CSI-like reporting of PRS-based measurement data using L1 and L2 signaling may be implemented.

Figure 6:
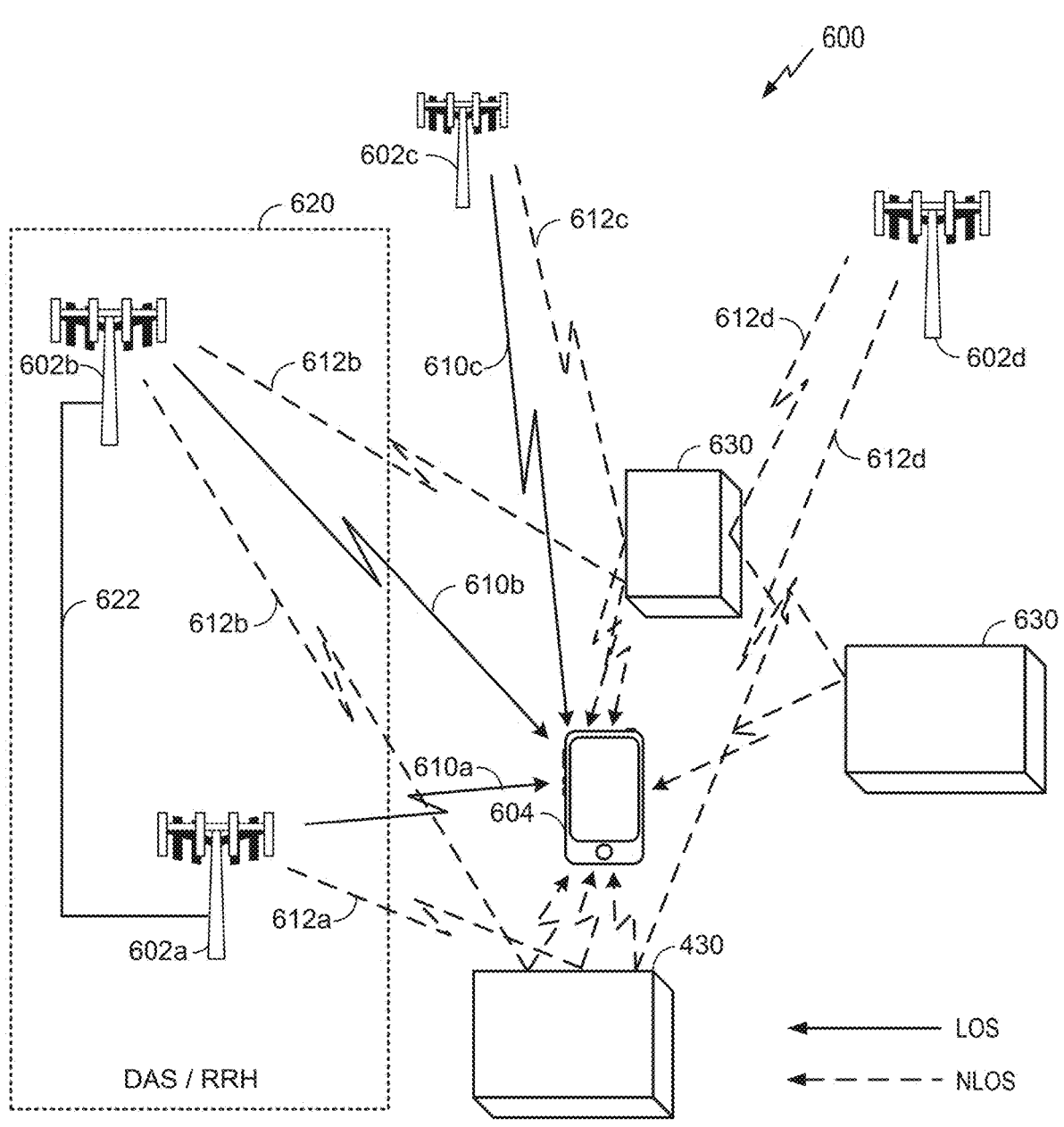
FIG. 6 illustrates an exemplary wireless communications system according to various aspects of the disclosure.

FIG. 6 illustrates an exemplary wireless communications system 600 according to various aspects of the disclosure. In the example of FIG. 6, a UE 604, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602*a-d* (collectively, base stations 602), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 600 (i.e., the base stations locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6 illustrates one UE 604 and four base stations 602, as will be appreciated, there may be more UEs 604 and more or fewer base stations 602.

To support position estimates, the base stations 602 may be configured to broadcast reference RF signals (e.g., Positioning Reference Signals (PRS), Cell-specific Reference Signals (CRS). Channel State Information Reference Signals (CSI-RS), synchronization signals, etc.) to UEs 604 in their coverage areas to enable a UE 604 to measure reference RF signal timing differences (e.g., OTDOA or RSTD) between pairs of network nodes and/or to identify the beam that best excite the line of sight (LOS) or shortest radio path between the UE 604 and the transmitting base stations 602. Identifying the LOS/shortest path beam(s) is of interest not only because these beams can subsequently be used for OTDOA measurements between a pair of base stations 602, but also because identifying these beams can directly provide some positioning information based on the beam direction. Moreover, these beams can subsequently be used for other position estimation methods that require precise ToA, such as round-trip time estimation-based methods.

As used herein, a "network node" may be a base station 602, a cell of a base station 602, a remote radio head, an antenna of a base station 602, where the locations of the antennas of a base station 602 are distinct from the location of the base station 602 itself, or any other network entity capable of transmitting reference signals. Further, as used herein, a "node" may refer to either a network node or a UE.

A location server (e.g., location server 230) may send assistance data to the UE 604 that includes an identification of one or more neighbor cells of base stations 602 and configuration information for reference RF signals transmitted by each neighbor cell. Alternatively, the assistance data can originate directly from the base stations 602 themselves (e.g., in periodically broadcasted overhead messages, etc.). Alternatively, the UE 604 can detect neighbor cells of base stations 602 itself without the use of assistance data. The UE 604 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 602 or antenna (s) that transmitted the reference RF signals that the UE 604 measured), the UE 604 or the location server can determine the distance between the UE 604 and the measured network nodes and thereby calculate the location of the UE 604.

The term "position estimate" is used herein to refer to an estimate of a position for a UE 604, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate." a "fix estimate," or by some other term. The means of obtaining a location estimate may be referred to generically as "positioning." "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 602) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 604) and a neighbor base station whose reference RF signals the UE is measuring. Thus, FIG. 6 illustrates an aspect in which base stations 602*a* and 602*b* form a DAS/RRH 620. For example, the base station 602*a* may be the serving base station of the UE 604 and the base station 602*b* may be a neighbor base station of the UE 604. As such, the base station 602*b* may be the RRH of the base station 602*a*. The base stations 602*a* and 602*b* may communicate with each other over a wired or wireless link 622.

To accurately determine the position of the UE 604 using the OTDOAs and/or RSTDs between RF signals received from pairs of network nodes, the UE 604 needs to measure the reference RF signals received over the LOS path (or the shortest NLOS path where an LOS path is not available), between the UE 604 and a network node (e.g., base station 602, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 6 illustrates a number of LOS paths 610 and a number of NLOS paths 612 between the base stations 602 and the UE 604. Specifically, FIG. 6 illustrates base station 602*a* transmitting over an LOS path 610*a* and an NLOS path 612*a*, base station 602*b* transmitting over an LOS path 610*b* and two NLOS paths 612*b*, base station 602*c* transmitting over an LOS path 610*c* and an NLOS path 612*c*, and base station 602*d* transmitting over two NLOS paths 612*d*. As illustrated in FIG. 6, each NLOS path 612 reflects off some object 630 (e.g., a building). As will be appreciated, each LOS path 610 and NLOS path 612 transmitted by a base station 602 may be transmitted by different antennas of the base station 602 (e.g., as in a MIMO system), or may be transmitted by the same antenna of a base station 602 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 602 may be configured to use beamforming to transmit RF signals. In that case, some of the available beams may focus the transmitted RF signal along the LOS paths 610 (e.g., the beams produce highest antenna gain along the LOS paths) while other available beams may focus the transmitted RF signal along the NLOS paths 612. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 602 uses beamforming to transmit RF signals, the beams of interest for data communication between the base station 602 and the UE 604 will be the beams carrying RF signals that arrive at UE 604 with the highest signal strength (as indicated by, e.g., the Received Signal Received Power (RSRP) or SINR in the presence of a directional interfering signal), whereas the beams of interest for position estimation will be the beams carrying RF signals that excite the shortest path or LOS path (e.g., an LOS path 610). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 7, in some cases, the signal strength of RF signals on the LOS path 610 may be weaker (e.g., due to obstructions) than the signal strength of RF signals on an NLOS path 612, over which the RF signals arrive later due to propagation delay.

Figure 7:
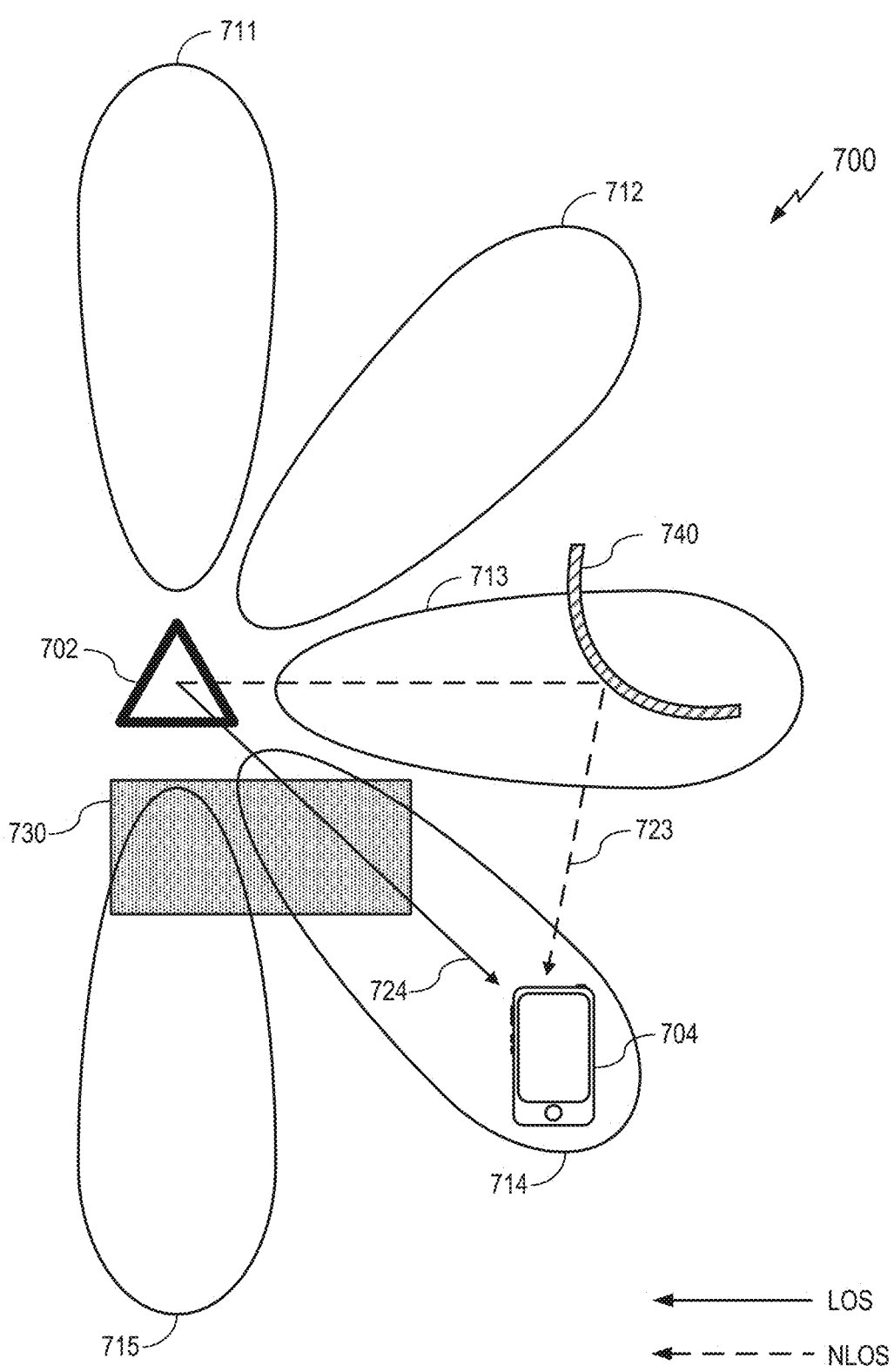
FIG. 7 illustrates an exemplary wireless communications system according to various aspects of the disclosure.

FIG. 7 illustrates an exemplary wireless communications system 700 according to various aspects of the disclosure. In the example of FIG. 7, a UE 704, which may correspond to UE 604 in FIG. 6, is attempting to calculate an estimate of its position, or to assist another entity (e.g., a base station or core network component, another UE, a location server, a third party application, etc.) to calculate an estimate of its position. The UE 704 may communicate wirelessly with a base station 702, which may correspond to one of base stations 602 in FIG. 6, using RF signals and standardized protocols for the modulation of the RF signals and the exchange of information packets.

As illustrated in FIG. 7, the base station 702 is utilizing beamforming to transmit a plurality of beams, e.g., beam 711-beam 715 of RF signals. Each beam 711-715 may be formed and transmitted by an array of antennas of the base station 702. Although FIG. 7 illustrates a base station 702 transmitting five beams 711-715, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 711-715 for purposes of distinguishing RF signals associated with one beam from RF signals associated with another beam. Moreover, the RF signals associated with a particular beam of the plurality of beams 711-715 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 7, the UE 704 receives an NLOS data stream 723 of RF signals transmitted on beam 713 and an LOS data stream 724 of RF signals transmitted on beam 714. Although FIG. 7 illustrates the NLOS data stream 723 and the LOS data stream 724 as single lines (dashed and solid, respectively), as will be appreciated, the NLOS data stream 723 and the LOS data stream 724 may each comprise multiple rays (i.e., a "cluster") by the time they reach the UE 704 due, for example, to the propagation characteristics of RF signals through multipath channels. For example, a cluster of RF signals is formed when an electromagnetic wave is reflected off of multiple surfaces of an object, and reflections arrive at the receiver (e.g., UE 704) from roughly the same angle, each travelling a few wavelengths (e.g., centimeters) more or less than others. A "cluster" of received RF signals generally corresponds to a single transmitted RF signal.

In the example of FIG. 7, the NLOS data stream 723 is not originally directed at the UE 704, although, as will be appreciated, it could be, as are the RF signals on the NLOS paths 612 in FIG. 6. However, it is reflected off a reflector 740 (e.g., a building) and reaches the UE 704 without obstruction, and therefore, may still be a relatively strong RF signal. In contrast, the LOS data stream 724 is directed at the UE 704 but passes through an obstruction 730 (e.g., vegetation, a building, a hill, a disruptive environment such as clouds or smoke, etc.), which may significantly degrade the RF signal. As will be appreciated, although the LOS data stream 724 is weaker than the NLOS data stream 723, the LOS data stream 724 will arrive at the UE 704 before the NLOS data stream 723 because it follows a shorter path from the base station 702 to the UE 704.

As noted above, the beam of interest for data communication between a base station (e.g., base station 702) and a UE (e.g., UE 704) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 714). That is, even if beam 713 (the NLOS beam) were to weakly excite the LOS path (due to the propagation characteristics of RF signals, even though not being focused along the LOS path), that weak signal, if any, of the LOS path of beam 713 may not be as reliably detectable (compared to that from beam 714), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 7, where the UE 704 is engaged in a data communication session with the base station 702 (e.g., where the base station 702 is the serving base station for the UE 704) and not simply attempting to measure reference RF signals transmitted by the base station 702, the beam of interest for the data communication session may be the beam 713, as it is carrying the unobstructed NLOS data stream 723. The beam of interest for position estimation, however, would be the beam 714, as it carries the strongest LOS data stream 724, despite being obstructed.

Figures 8A, 8B:
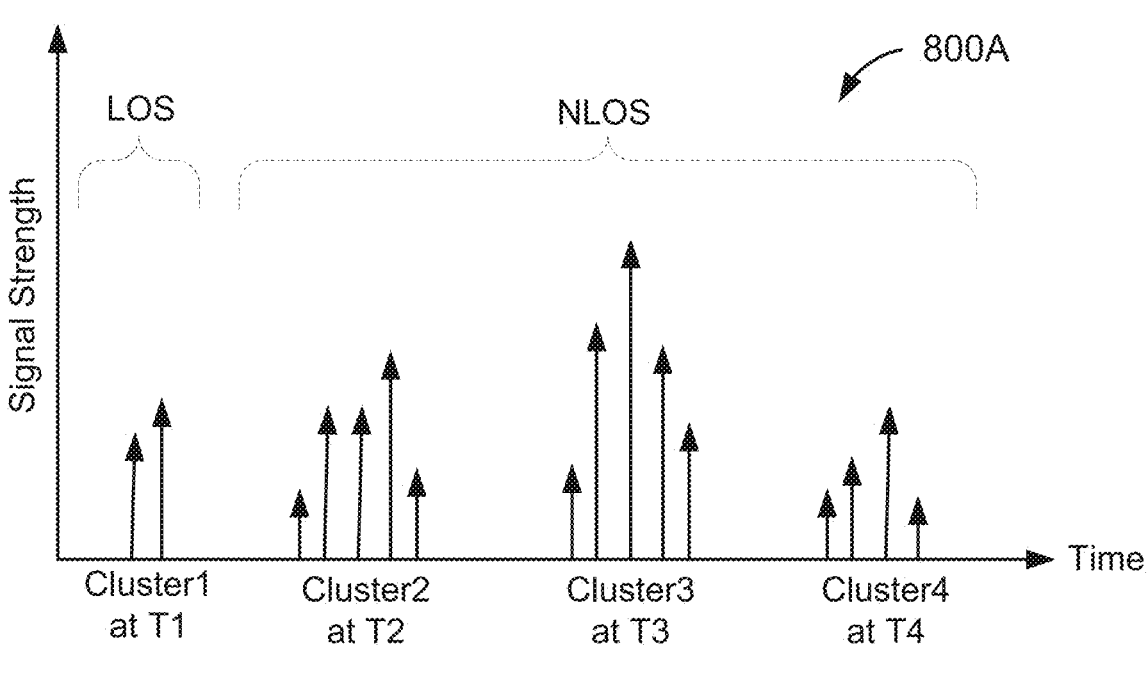
FIG. 8A is a graph showing the RF channel response at a receiver over time according to aspects of the disclosure.
FIG. 8B is a diagram illustrating this separation of clusters in AoD.

FIG. 8A is a graph 800A showing the RF channel response at a receiver (e.g., UE 704) over time according to aspects of the disclosure. Under the channel illustrated in FIG. 8A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5A, because the first cluster of RF signals at time T1 arrives first, it is presumed to be the LOS data stream (i.e., the data stream arriving over the LOS or the shortest path), and may correspond to the LOS data stream 724. The third cluster at time T3 is comprised of the strongest RF signals, and may correspond to the NLOS data stream 723. Seen from the transmitter's side, each cluster of received RF signals may comprise the portion of an RF signal transmitted at a different angle, and thus each cluster may be said to have a different angle of departure (AoD) from the transmitter.

FIG. 8B is a diagram 800B illustrating this separation of clusters in AoD. The RF signal transmitted in AoD range 802a may correspond to one cluster (e.g., "Cluster1") in FIG. 8A, and the RF signal transmitted in AoD range 802b may correspond to a different cluster (e.g., "Cluster3") in FIG. 8A. Note that although AoD ranges of the two clusters depicted in FIG. 8B are spatially isolated, AoD ranges of some clusters may also partially overlap even though the clusters are separated in time. For example, this may arise when two separate buildings at same AoD from the transmitter reflect the signal towards the receiver. Note that although FIG. 8A illustrates clusters of two to five channel taps (or "peaks"), as will be appreciated, the clusters may have more or fewer than the illustrated number of channel taps.

RAN1 NR may define UE measurements on DL reference signals (e.g., for serving, reference, and/or neighboring cells) applicable for NR positioning, including DL reference signal time difference (RSTD) measurements for NR positioning, DL RSRP measurements for NR positioning, and UE Rx-Tx (e.g., a hardware group delay from signal reception at UE receiver to response signal transmission at UE transmitter, e.g., for time difference measurements for NR positioning, such as RTT).

RAN1 NR may define gNB measurements based on UL reference signals applicable for NR positioning, such as relative UL time of arrival (RTOA) for NR positioning, UL AoA measurements (e.g., including Azimuth and Zenith Angles) for NR positioning, UL RSRP measurements for NR positioning, and gNB Rx-Tx (e.g., a hardware group delay from signal reception at gNB receiver to response signal transmission at gNB transmitter, e.g., for time difference measurements for NR positioning, such as RTT).

Figure 9A:
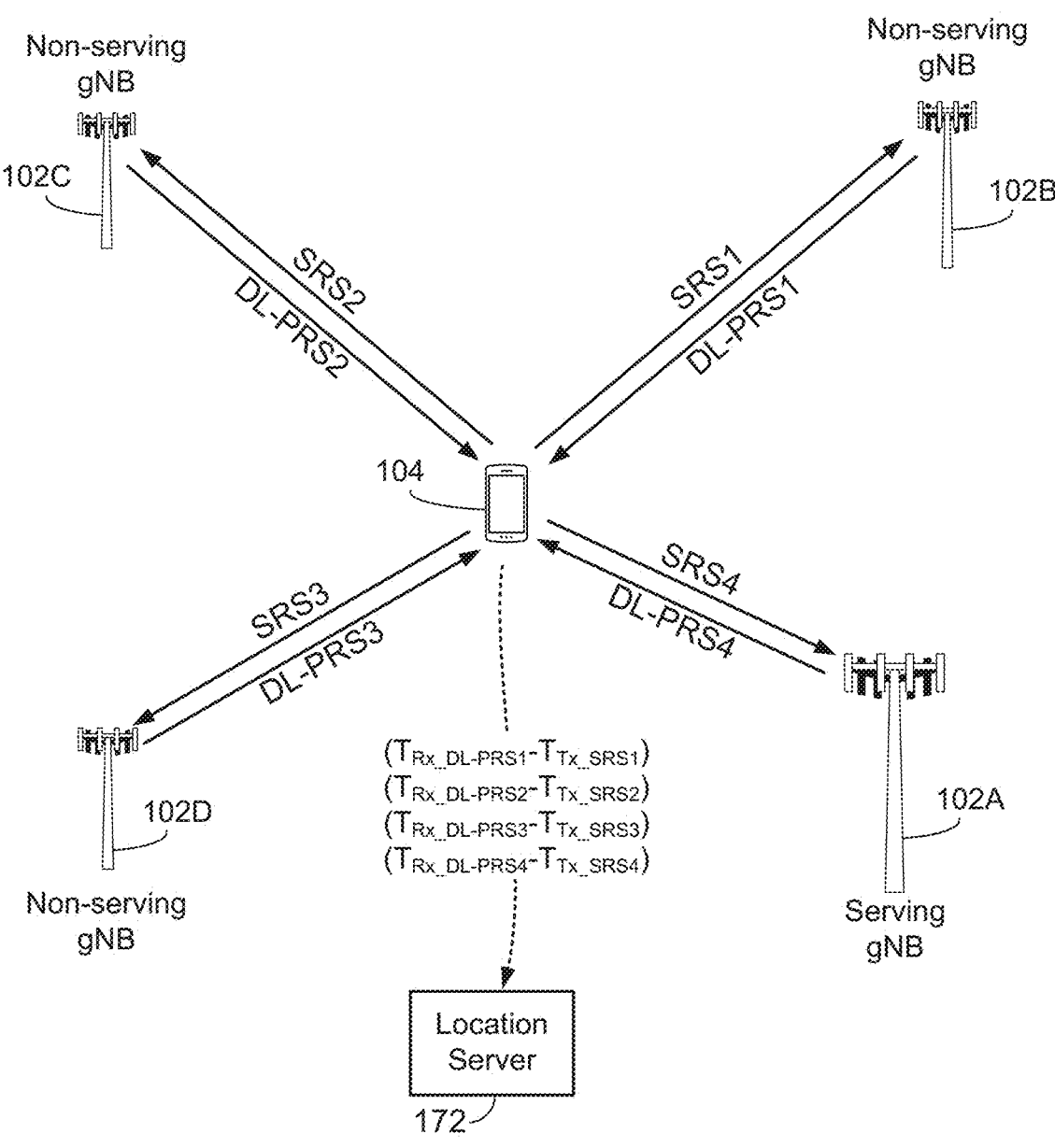
FIG. 9A illustrates a conventional multi-RTT based positioning being performed in a network.

FIG. 9A illustrates a conventional multi-RTT based positioning being performed in a network. In conventional multi-RTT based positioning, UL measurements from non-serving gNBs are needed in order to determine the location of the UE. Thus, in the example illustrated in FIG. 9, a UE 104 communicates with four gNBs, e.g., a serving gNB 102A, and three non-serving gNBs, e.g., gNB 102B, gNB 102C, and gNB 102D. The UE 104 receives DL-PRS signals from each of the gNBs 102A-102D, and transmits SRS signals to each of the gNBs 102A-102D. In UE-assisted multi-RTT, the UE 104 reports to a location server 172 the time delay between receiving the DL-PRS signal from that gNB and sending the SRS signal to that gNB. With this information the location server 172 can determine the RTT from the UE 104 to that gNB. From the RTT value, the distance between the UE 104 and that gNB can be calculated. Using the calculated distances to multiple gNBs, the position of the UE 104 can be estimated.

Figure 9B:
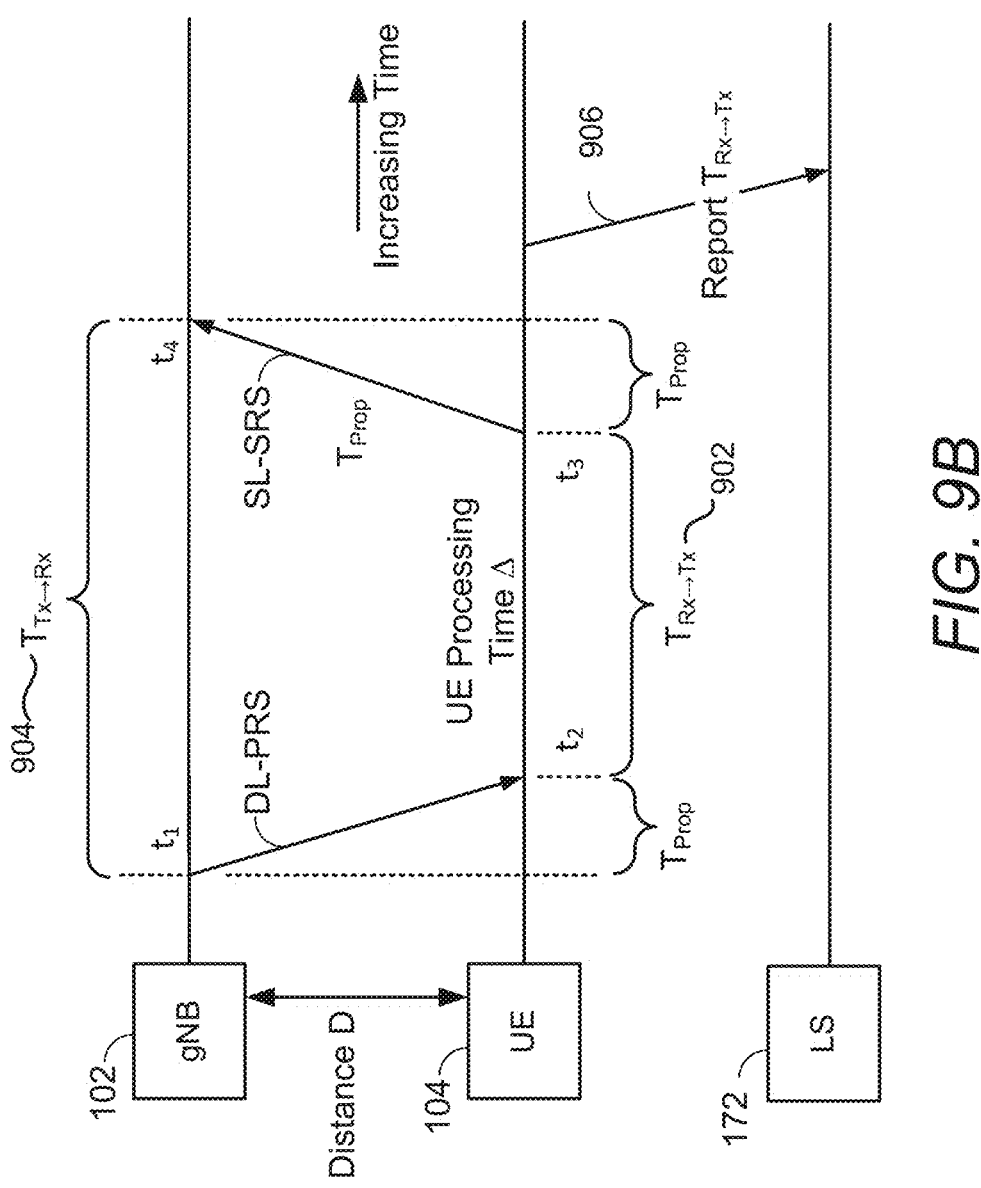
FIG. 9B is a diagram showing exemplary timings of RTT measurement signals exchanged between a base station and a UE.

FIG. 9B is a diagram showing exemplary timings of RTT measurement signals exchanged between a gNB 102 (e.g., gNB 102A in FIG. 9A or any of the base stations described herein) and a UE 104 (e.g., UE 104 in FIG. 9A or any of the UEs described herein), such as in the scenario shown in FIG. 9A. In the example of FIG. 9B, the gNB 102 sends a DL-PRS to the UE 104 at time $t_1$. The DL-PRS has some propagation delay $T_{Prop}$ as it travels from the gNB 102 to the UE 104. At time $t_2$ (the ToA of the DL-PRS at the UE 104), the UE 104 receives/measures the DL-PRS. After some UE processing time, the UE 104 transmits an SL-SRS at time $t_3$. After the propagation delay $T_{Prop}$, the gNB 102 receives/measures the SL-SRS from the UE 104 at time $t_4$ (the ToA of the SL-SRS at the gNB 102).

In order to identify the ToA (e.g., $t_2$) of the DL-PRS, the UE 104 first jointly processes all the resource elements (REs) on the channel on which the transmitter is transmitting the reference signal, and performs an inverse Fourier transform to convert the received reference signals to the time domain. The conversion of the received reference signals to the time domain is referred to as estimation of the channel energy response (CER). The CER shows the peaks on the channel over time, and the earliest "significant" peak should therefore correspond to the ToA of the reference signal. Generally, the receiver will use a noise-related quality threshold to filter out spurious local peaks, thereby presumably correctly identifying significant peaks on the channel. For example, the receiver may choose a ToA estimate that is the earliest local maximum of the CER that is at least X dB higher than the median of the CER and a maximum Y dB lower than the main peak on the channel. The receiver determines the CER for each reference signal from each transmitter in order to determine the ToA of each reference signal from the different transmitters.

The UE 104 sends a message 906 to a location server 172 or other positioning entity to report the difference between time $t_3$ and time $t_2$ (i.e., $T_{Rx \to Tx}$ 902). Using this measurement and the difference between time $t_4$ and time $t_1$ (i.e., $T_{Tx \to Rx}$ 904), the location server or other positioning entity can calculate the distance to the UE 104 as:

$$d = \frac{1}{2c}(T_{Tx \to Rx} - T_{Rx \to Tx}) = \frac{1}{2c}(t_2 - t_1) - \frac{1}{2c}(t_4 - t_3)$$

where c is the speed of light. While not illustrated expressly in FIG. 9B, an additional source of delay or error may be due to UE and gNB hardware group delay for position location.

Figure 9C:
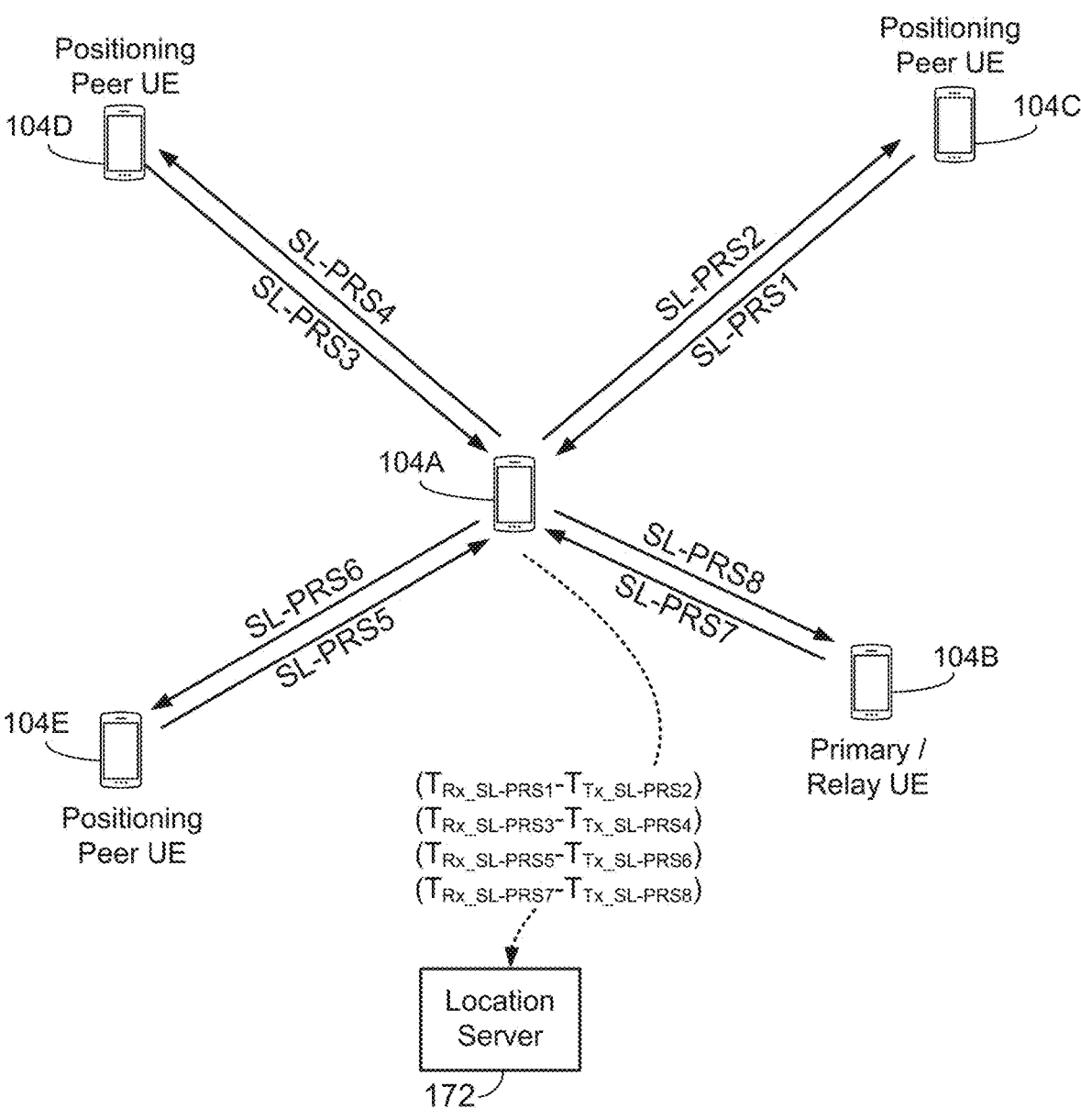
FIG. 9C illustrates a variant of the multi-RTT based positioning technique in FIG. 9A.

FIG. 9C illustrates a variant of the multi-RTT positioning technique in FIG. 9A, except that instead of receiving DL-PRS signals from a gNB, and transmitting UL-SRS signals to a gNB, in FIG. 9C, a UE 104A exchanges SL-PRS signals with other positioning peer UEs, e.g., UE 104B, UE 104C, UE 104D, and UE 104E, one of which may have the role of primary or relay UE between the UE 104A and a gNB (not shown in FIG. 9C). The UE 104A may report to a location server (e.g., via the relay UE) the time delays between receiving the SL-PRS signal from a positioning peer UE and sending the SL-PRS signal to that positioning peer UE. With this information the RTT values can be determined, the distances between the UE 104A and each of the UEs 104B-104E can be calculated, and the position of the UE 104 can be estimated.

Figure 10:
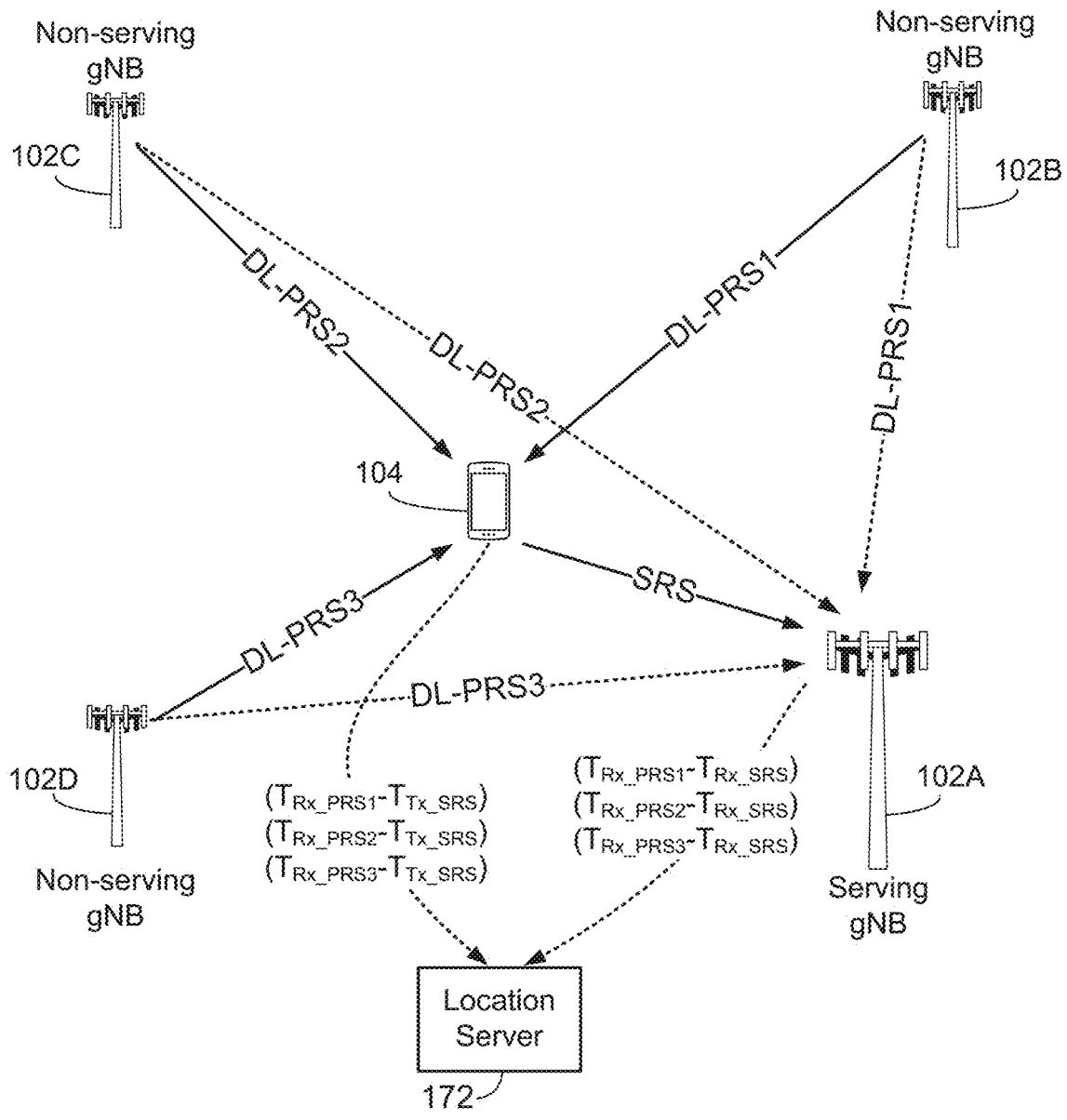
FIG. 10 illustrates multi-RTT based positioning method that can be performed by a power-limited UE according to aspects of the disclosure.
Figure 11:
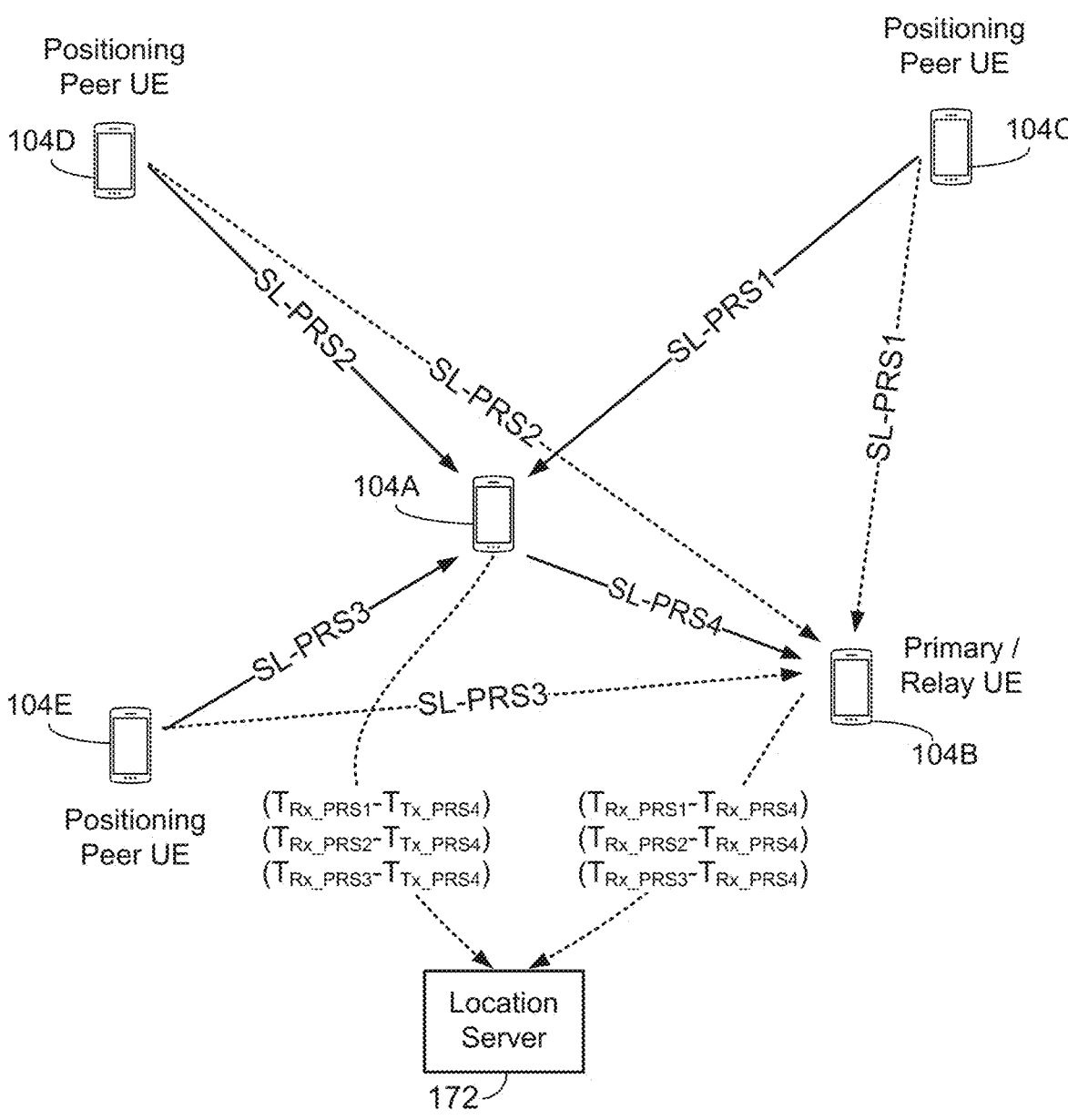
FIG. 11 illustrates another multi-RTT based positioning method that can be performed by a power-limited UE according to aspects of the disclosure.

For low-tier (low-capacity) UEs, such as "NR Light" UEs, the methods illustrated in FIGS. 9A to 9C may pose some technical challenges, e.g., due to the reduced processing power or reduced battery power that such devices may have. During downlink communication, a low-capability UE may not be able to hear the PRS from multiple TRPs due to antenna loss, low bandwidth, or reduced baseband processing capabilities. During uplink communication, a low-capability UE generally has enough power to transmit to the serving cell but may not have enough power to transmit to the neighboring cells. For example, in FIG. 9A, it may be difficult for the UE 104 to detect DL-PRS signals from, and/or transmit UL-SRS signals to, the distant, non-serving gNBs. Likewise, in FIG. 9C, the UE 104A may have poor communications with one or more of the UEs 104B-104E. Thus, coverage could be an issue for NR Light UEs. This may also result in a lower quality of UL measurements for NR Light UE positioning. For DL+UL based positioning, such as multi-RTT, the UL signals may be the performance limiting factor, especially for NR Light UEs and other power-limited UEs. Thus, there is a need for a positioning technique that can be performed by a power-limited UE, even in networks that are not tightly synchronized. FIGS. 10 and 11 illustrate such techniques.

FIG. 10 illustrates multi-RTT based positioning method that can be performed by a power-limited UE according to aspects of the disclosure. In FIG. 10, the power-limited UE 104 receives DL-PRS signals from non-serving gNBs, e.g., DL-PRS1 from gNB 102B, DL-PRS2 from gNB 102C, and DL-PRS3 from gNB 102D, and transmits an SRS signal to the serving gNB, e.g., gNB 102A, but not to the non-serving gNBs. The serving gNB 102A measures and reports the UL measurement with respect to the power-limited UE 104. The serving gNB 102A is very likely to have acceptable UL measurement quality for the power-limited UE 104. The UE 104 also reports to a location server 172 multiple Rx-Tx time difference reports, e.g., the delay between receiving DL-PRS1 and sending the SRS, the delay between receiving DL-PRS2 and sending the SRS, and the delay between receiving the DL-PRS3 and sending the SRS. The serving gNB 102A also will have received DL-PRS1, DL-PRS2, and DL-PRS3, and thus can send to the location server 172 additional Rx-Rx time difference reports indicating the delay between receiving a DL-PRS from a non-serving gNB and receiving the SRS from the UE 104. The location server 172 will then have enough information to determine the location of the UE 104, since the locations of the serving and non-serving gNBs are known. In this method, the UE 104 is not required to transmit SRS with high power to reach non-serving gNBs, which is efficient for power limited UE, such as NR-Light UE. Similar to the RTT based positioning, there is no high requirement on network synchronization across the gNBs.

FIG. 11 illustrates another multi-RTT based positioning method that can be performed by a power-limited UE according to aspects of the disclosure. In FIG. 1, the power-limited UE 104A receives SL-PRS signals from positioning peer UEs, e.g., SL-PRS1 from UE 104C, SL-PRS2 from UE 104D, and SL-PRS3 from UE 104E, and transmits an SL-PRS signal (e.g., SL-PRS4) to a primary/relay UE, e.g., UE 104B, but not to the positioning peer UEs. The primary/relay UE 104B measures and reports the UL measurement with respect to the power-limited UE 104A. The primary/relay UE 104B is very likely to have acceptable UL measurement quality for the power-limited UE 104A. The UE 104A may also report to the location server 172 multiple Rx-Tx time difference reports, e.g., the delay between receiving SL-PRS1 and sending SL-PRS4, the delay between receiving SL-PRS2 and sending SL-PRS4, and the delay between receiving SL-PRS3 and sending SL-PRS4. These Rx-Tx time difference reports may be sent to the location server 172 via the primary/relay UE 104B. The primary/relay UE 104B also will have received SL-PRS1, SL-PRS2, and SL-PRS3, and thus can send to the location server 172 additional Rx-Rx time difference reports indicating the delay between receiving a SL-PRS from a positioning peer UEs 104C-104E and receiving the SL-PRS from the UE 104A. The location server 172 will then have enough information to determine the location of the UE 104A, provided that the locations of the positioning peer UEs 104C-104E and the primary/relay UE 104B are known. In this method, the UE 104A is not required to transmit SL-PRS with power to reach even a serving gNB, but need only reach the primary/relay UE 104B, which is efficient for power limited UE, such as NR-Light UE. Similar to the RTT based positioning, there is no high requirement on network synchronization across the gNBs.

Figure 12:
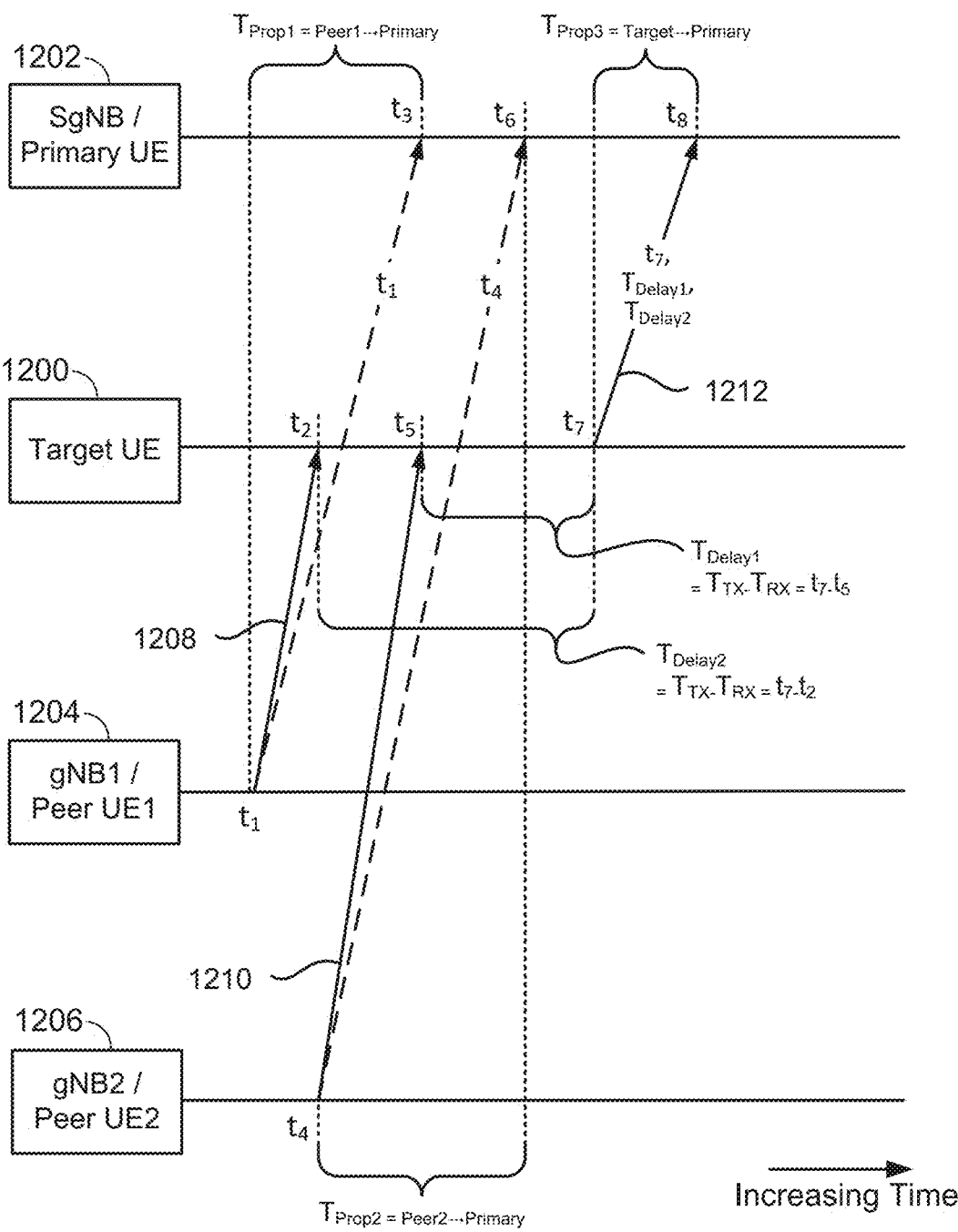
FIG. 12 illustrates timing of signals used in a multi-RTT based positioning method that can be performed by a power-limited UE according to aspects of the disclosure.

FIG. 12 illustrates timing of signals used in a multi-RTT based positioning method that can be performed by a power-limited UE according to aspects of the disclosure. In the example illustrated in FIG. 12, a target UE 1200 is served by a serving entity 1202, which may be a serving gNB or a primary positioning UE, and receives positioning signals from entity 1204 and entity 1206, which may be non-serving gNBs or positioning peer UEs. In FIG. 12, at time $t_1$, the entity 1204 sends a positioning signal 1208, which is received by the target UE 1200 at time $t_2$ and also received by the serving entity 1202 at time $t_2$. The positioning signal 1208 includes an indication of the time at which it was transmitted by the entity 1204, i.e., time $t_1$. At time $t_4$, the entity 1206 sends a positioning signal 1210, which is received by the target UE 1200 at time $t_5$ and also received by the serving entity 1202 at time $t_6$. The positioning signal 1210 includes an indication of the time at which it was transmitted by the entity 1206, i.e., time $t_4$. At time $t_7$, the target UE 1200 sends a positioning signal 1212 to the serving entity 1202, which receives the positioning signal 1212 at time $t_8$. The positioning signal 1212 includes an indication of the time at which was transmitted by the target UE 1200, i.e., time $t_7$. The target UE 1200 also notifies the serving entity of the values of $T_{Delay1}$, which is the time between receiving the positioning signal 1210 and sending the positioning signal 1212, and $T_{Delay2}$, which is the time between receiving the positioning signal 1208 and sending the positioning signal 1212. This information may be part of the positioning signal 1212 or send in one or more other signals to the serving entity 1202.

The serving entity 1202 can calculate the propagation delay $T_{Prop1}$, which is proportional to the distance between the serving entity 1202 and the entity 1204, as the difference between $t_3$ and $t_1$. The serving entity 1202 can calculate the propagation delay $T_{Prop2}$, which is proportional to the distance between the serving entity 1202 and the entity 1206, as the difference between $t_6$ and $t_4$. The serving entity 1202 can calculate the propagation delay $T_{Prop3}$, which is proportional to the distance between the serving entity 1202 and the entity target entity 1200, as the difference between $t_8$ and $t_7$. Using $T_{Prop3}$, the serving entity 1202 can estimate the range from itself to the target UE 1200.

The serving entity 1202 can also estimate the range from the entity 1204 to the target UE 1200 based on its knowledge of $t_1$ (which it knows from receiving positioning signal 1208), $T_{Delay2}$ (which it received from the target UE 1200), and $T_{Prop3}$ (which it derived from positioning signal 1212. Using these values, the serving entity 1202 can calculate the propagation time $(t_2-t_1)$, and from that the serving entity 1202 can calculate the distance from entity 1204 to the target UE 1200. In the same manner, the serving entity 1204 can calculate the propagation time $(t_5-t_4)$, and from that the serving entity 1202 can calculate the distance from entity 1206 to the target UE 1200. With these distances, the location of the target UE 1200 can be estimated.

While the positioning methods illustrated in FIGS. 10 and 12 are well suited for power-limited UEs, other UE types can benefit from those methods. Currently, however, there is no defined mechanism by which a UE can make a request for, or indicate a preference for, the positioning methods shown in FIGS. 10 and 12 over the positioning methods shown in FIGS. 9A and 9B. Therefore, techniques to enable dynamic configurability between a regular RTT positioning procedure and high-precision positioning method for UL power-limited UEs are herein presented, including scenarios in which a UL power-limited UE need transmit a UL-SRS or SL-PRS signals to only one entity, such as the serving gNB or a primary or relay positioning peer UE.

Figure 13:
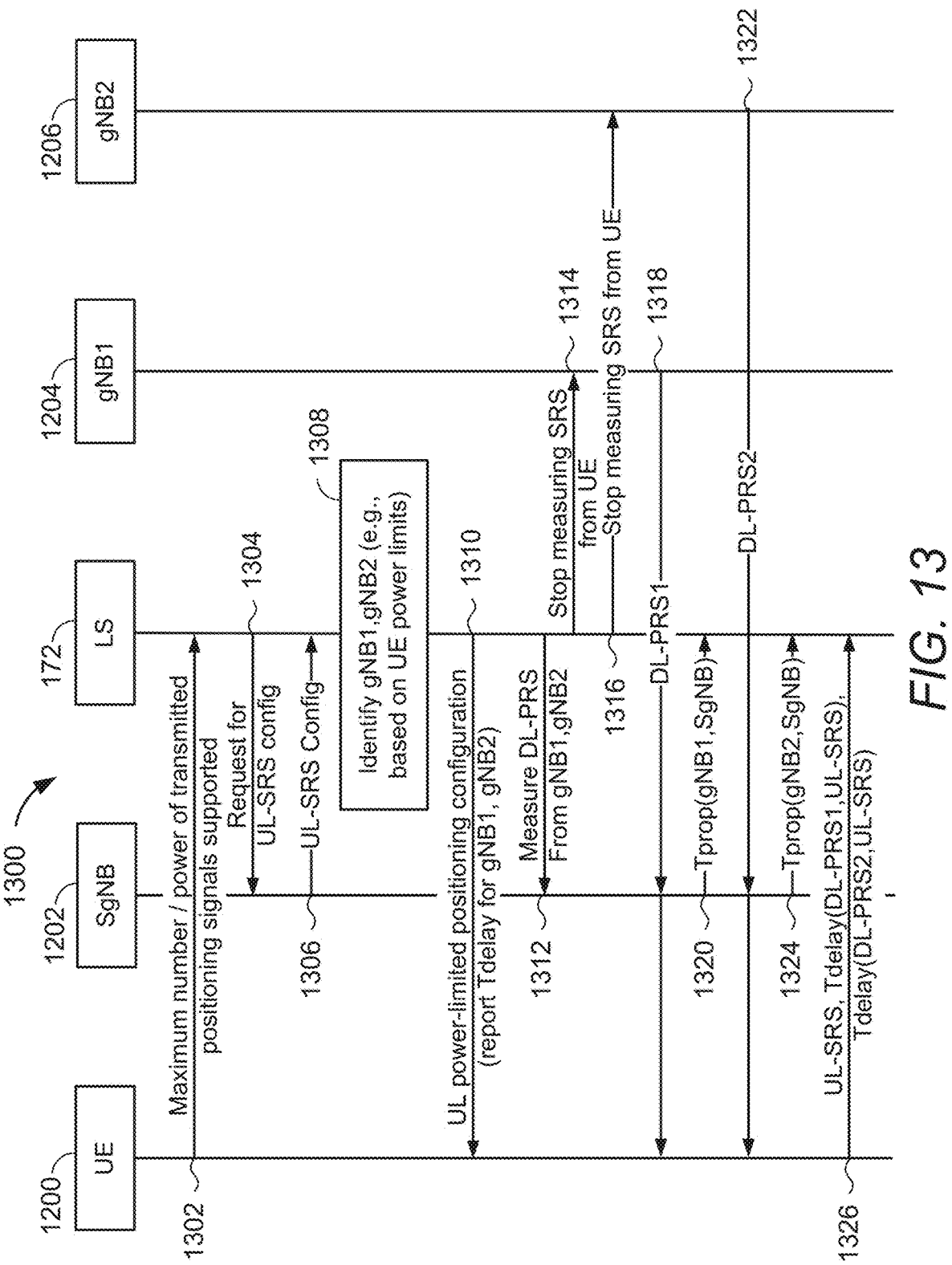
FIGS. 13 to 15 are messaging and event diagrams illustrating methods for high-precision positioning methods for UL power-limited UEs according to aspects of the disclosure.

FIG. 13 is a messaging and event diagram illustrating a method 1300 for high-precision positioning methods for UL power-limited UEs according to aspects of the disclosure. The method 1300 may be performed in a scenario such as the one illustrated in FIG. 10, e.g., involving a target UE 1200, an SgNB 1202, a location server (LS) 172, an one or more non-serving gNBs, such as gNB1 1204 and gNB2 1206. In the example shown in FIG. 13, the UE 1200 sends, to the LS, an indication of the maximum number of and/or maximum power for transmitted positioning signals that the UE 1200 can support (message 1302). The LS 172 sends, to the SgNB 1202, a request for one or more UL-SRS configurations (message 1304), which it receives from the SgNB 1202 (message 1306). Examples of information that the LS 172 can request from the SgNB 1202 include, but are not limited to: the number of periodic transmissions; whether the positioning signals are periodic, semi-periodic, aperiodic; for periodic transmissions, the periodicity; the bandwidth in FR1 or FR2; the number of SRS resources used; and pathloss references sources (but not other power control parameters).

Based on the received UL-SRS configuration, the LS 172 identifies non-serving gNBs that are likely to not receive a low-power UL-SRS from the target UE 1200 (block 1308) e.g., due to the target UE's sub-optimal transmit beam configuration or limited transmit power, and issues a set of configuration instructions to the UE 1200 and the identified non-serving gNBs, e.g., gNB1 1204 and gNB2 1206. For example, in FIG. 13, the LS 172 sends, to the UE 1200, an UL power-limited positioning configuration (message 1310), including an instruction for the UE 1200 to report to the LS 172 the time delays between receiving a DL-PRS from gNB1 1204 or gNB2 1206 and sending an UL-SRS to the LS 172. In FIG. 13, the LS 172 instructs SgNB 1202 to measure the DL-PRS signals from gNB1 and gNB2 (message 1312), instructs the gNB1 1204 to stop measuring UL-SRS signals from the UE 1200 (message 1314), and instructs the gNB2 1206 to stop measuring UL-SRS signals from the UE 1200 (message 1316). The messages 1310, 1312, 1314, and 1316 may be sent in any order.

In FIG. 13, the UE 1200, the SgNB 1202, and the LS 172 engage in a UL power-limited positioning operation as follows. The gNB1 1204 transmits a first DL-PRS signal 1318, which the SgNB 1202 receives and measures, and which the UE 1200 also receives and measures. The SgNB 1202 calculates the propagation time from the gNB1 1204 to the SgNB 1202 based at least in part on the received signal 1318, and reports the propagation time to the LS 172 (message 1320). The gNB2 1206 transmits a second DL-PRS signal 1322, which the SgNB 1202 receives and measures, and which the UE 1200 also receives and measures. The SgNB 1202 calculates the propagation time from the gNB2 1206 to the SgNB 1202 based at least in part on the received signal 1322, and reports the propagation time to the LS 172 (message 1324). The UE 1200 then transmits an UL-SRS signal 1326 to the SgNB 1202, and notifies the LS 172 of the time delay between receiving the DL-PRS1 from the gNB1 1204 and sending the UL-SRS signal 1326, and the time delay between receiving the DL-PRS2 from the gNB2 1206 and sending the UL-SRS signal 1326. The LS 172 can then estimate the location of the UE 1200 at least using methods such as those described in FIG. 12.

Figure 14:
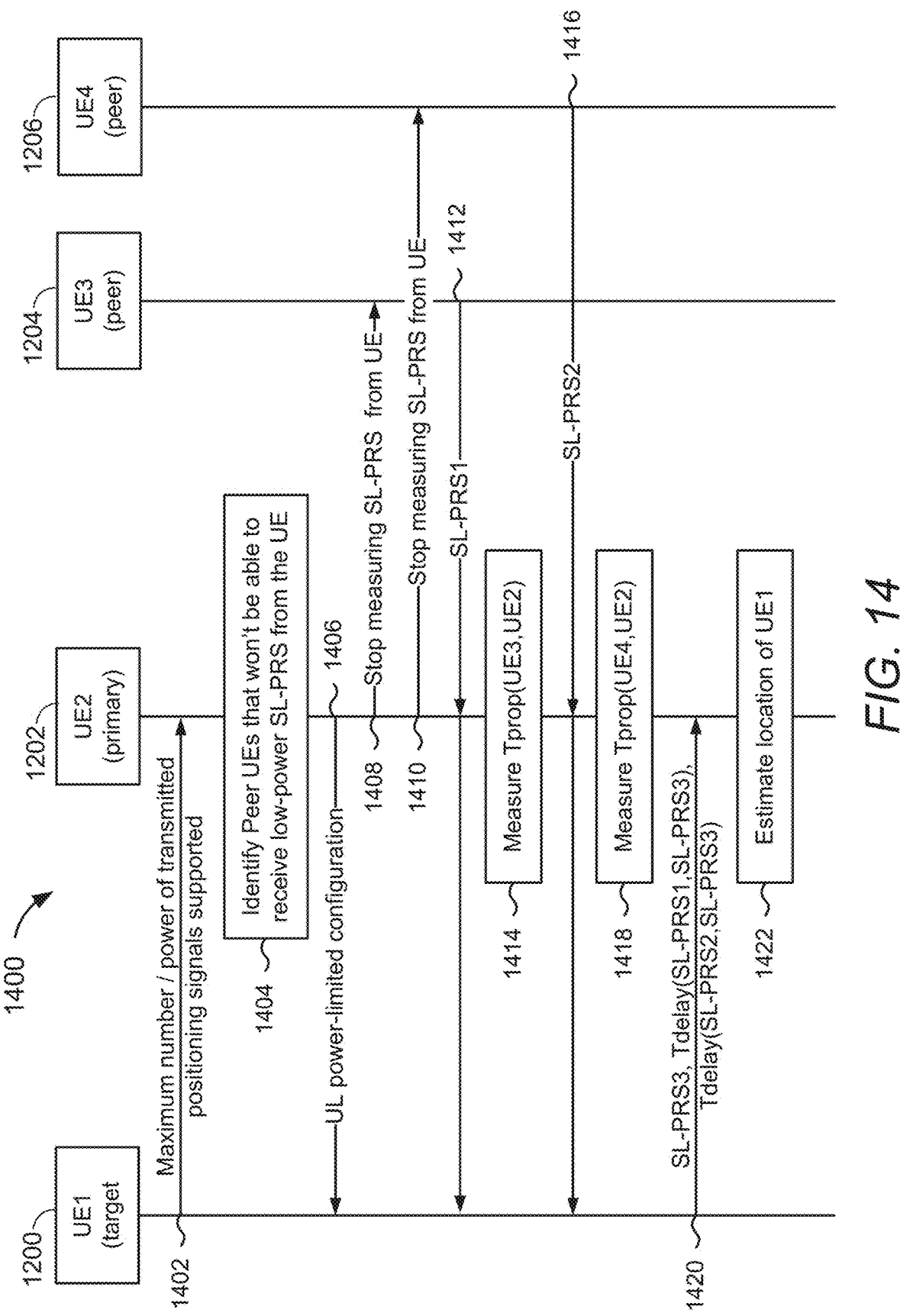

FIG. 14 is a messaging and event diagram illustrating a method 1400 for high-precision positioning methods for UL power-limited UEs according to aspects of the disclosure. The method 1400 may be performed in a scenario such as the one illustrated in FIG. 11, e.g., involving a target UE1 1200, a primary or relay UE2 1202, and one or more positioning peer UEs, such as UE3 1204 and UE4 1206. In the example shown in FIG. 14, the UE1 1200 sends, to the primary UE2 1202, an indication of the maximum number or and/or the maximum power for transmitted positioning signals that the UE 1200 can support (message 1402). In some aspects, the target UE1 1200 asks the primary UE2 1202 for a specific transmit power, for specific SL-PRS transmission properties, etc. The primary UE2 1202 identifies positioning peer UEs that are likely to not receive a low-power SL-PRS from the target UE1 1200 (block 1404), and issues a set of configuration instructions to the UE 1200 and the identified positioning peer UEs, e.g., UE3 1204 and UE4 1206. For example, in FIG. 14, the primary UE 1202 sends, to the UE 1200, an UL power-limited positioning configuration (message 1406), including an instruction for the UE 1200 to report to the LS 172 the time delays between receiving a SL-PRS from UE3 1204 or UE4 1206 and sending an SL-PRS to the primary UE2 1202. In FIG. 14, the primary UE2 1202 instructs the UE3 1204 to stop measuring SL-PRS signals from the target UE1 1200 (message 1408), and instructs the UE3 1206 to stop measuring SL-PRS signals from the target UE1 1200 (message 1410). The messages 1406, 1408, and 1410 may be sent in any order.

In FIG. 14, the target UE1 1200 and the primary UE2 1202 engage in a UL power-limited positioning operation as follows. The UE3 1204 transmits a first SL-PRS signal 1412, which the primary UE2 1202 receives and measures, and which the target UE1 1200 also receives and measures. The primary UE2 1202 calculates the propagation time from the UE3 1204 to the primary UE2 1202 based at least in part on the received signal 1412 (block 1414). The UE4 1206 transmits a second SL-PRS signal 1416, which the primary UE2 1202 receives and measures, and which the target UE1 1200 also receives and measures. The primary UE2 1202 calculates the propagation time from the UE4 1206 to the primary UE2 1202 based at least in part on the received signal 1416 (block 1418). The target UE1 1200 then transmits a third SL-PRS signal 1420 to the primary UE2 1202, and notifies the primary UE2 1202 of the time delay between receiving the SL-PRS1 from the UE3 1204 and sending the SL-PRS signal 1420, and the time delay between receiving the SL-PRS2 from the UE4 1206 and sending the SL-PRS signal 1420. The primary UE2 1202 can then estimate the location of the target UE1 1200 (block 1422) at least using methods such as those described in FIG. 12.

Figure 15:
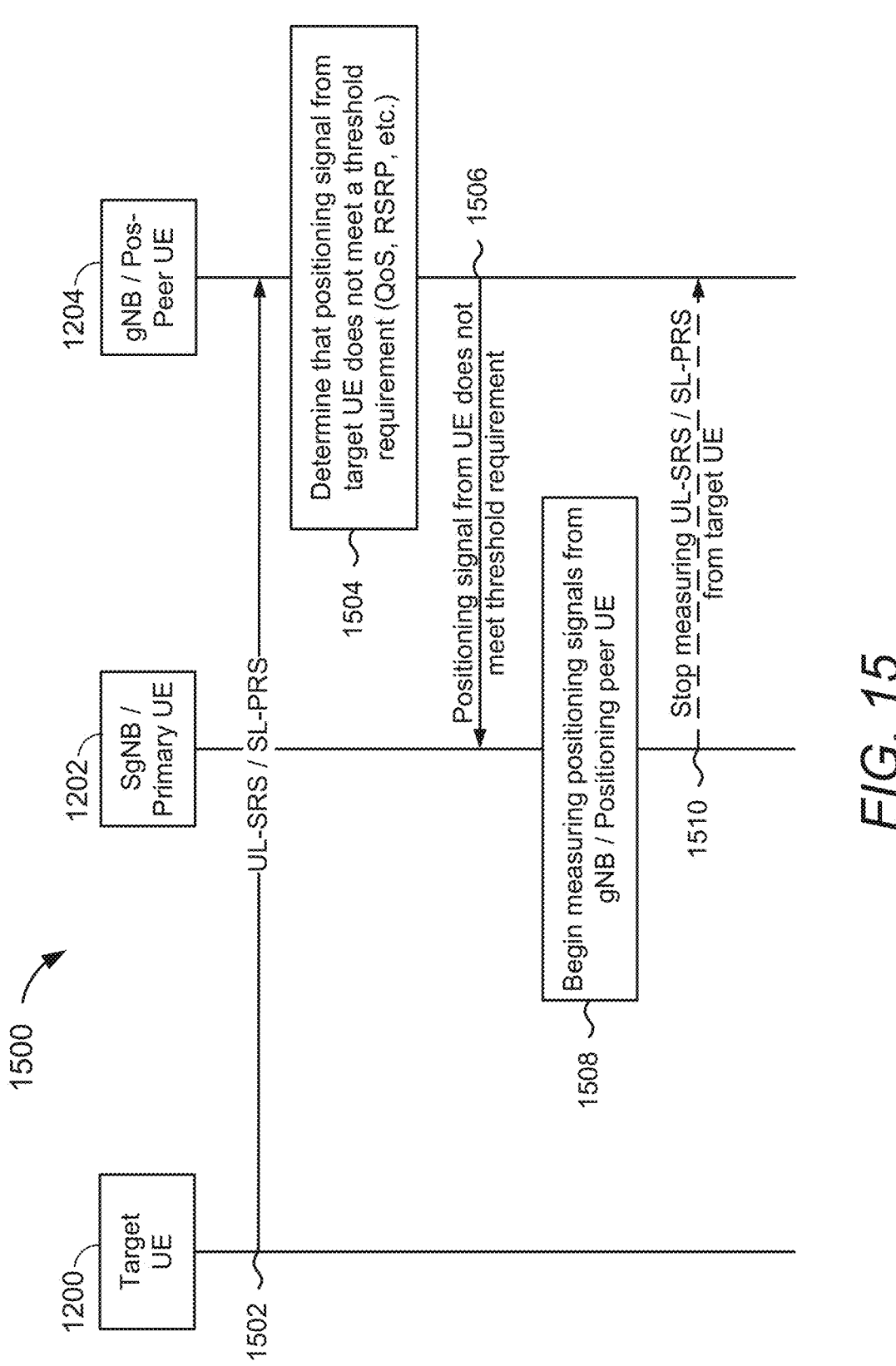

FIG. 15 is a messaging and event diagram illustrating a method 1500 for high-precision positioning methods for UL power-limited UEs according to aspects of the disclosure. The method 1500 may be performed in a scenario such as the ones illustrated in FIG. 10 and FIG. 11, e.g., involving a target UE 1200, a SgNB or primary UE 1202, and a non-serving gNB or positioning peer UE 1204. In the example shown in FIG. 15, the non-serving gNB or positioning peer UE 1204 receives a positioning signal (e.g., an UL-SRS or SL-PRS signal) from the target UE 1200 (message 1502) and determines that the positioning signal docs not meet a threshold requirement, e.g., for QoS, RSRP, etc. (block 1504). Due to channel reciprocity, for example, the non-serving gNB or positioning peer UE 1204 may reasonably presume that the target UE 1200 may not be able to successfully receive positioning signals transmitted by the non-serving gNB/positioning peer UE 1204. In FIG. 15, the non-serving gNB or positioning peer UE 1204 notifies the SgNB or primary peer UE 1202 of this fact (message 1506) and may also request that the SgNB or primary peer UE 1202 measure the positioning signals from the non-serving gNB or positioning peer UE 1204 on behalf of the target UE 1200. The SgNB or primary peer UE 1202 begins measuring the positioning signals from the non-serving gNB/positioning peer UE 1204 on behalf of the target UE 1200 (block 1508). In some aspects, the SgNB/primary peer UE 1202 may instruct the non-serving gNB/positioning peer UE 1204 to stop measuring UL-SRS or SL-PRS signals from the target UE 1200 (message 1510).

FIG. 16 is a flowchart of an example process 1600 for wireless positioning according to some aspects of the disclosure. In some implementations, one or more process blocks of FIG. 16 may be performed by a user equipment (UE) (e.g., UE 104). In some implementations, one or more process blocks of FIG. 16 may be performed by another device or group of devices separate from or including the UE. Additionally, or alternatively, one or more process blocks of FIG. 16 may be performed by one or more components of UE 302, such as processor(s) 332, memory 340, WWAN transceiver(s) 310, short-range wireless transceiver(s) 320, SPS receiver 330, sensor(s) 344, user interface 346, and positioning module(s) 342, any or all of which may be means for performing the operations of process 1600.

As shown in FIG. 16, process 1600 may include sending, to a first entity, first information indicating a maximum number of positioning signal transmissions or a maximum power for positioning signal transmissions that the UE can support (block 1610). Means for performing the operation of block 1610 may include the processor(s) 332, memory 340, or WWAN transceiver(s) 310 of the UE 302. For example, the UE 302 may send the first information using the transmitter(s) 314. In some aspects, the first entity comprises a location server, a serving base station, or a primary or relay positioning peer UE.

As further shown in FIG. 16, process 1600 may include receiving, from the first entity, configuration information for changing a positioning mode to a positioning mode selected from a first positioning mode and a second positioning mode (block 1620). Means for performing the operation of block 1620 may include the processor(s) 332, memory 340, or WWAN transceiver(s) 310 of the UE 302. For example, the UE 302 may receive the configuration information using the receiver(s) 312.

As further shown in FIG. 16, process 1600 may include performing a positioning operation according to the selected positioning mode, (block 1630). Means for performing the operation of block 1630 may include the processor(s) 332, memory 340, or WWAN transceiver(s) 310 of the UE 302. For example, the UE 302 may perform a positioning operation according to the selected positioning mode, by transmitting positioning signals using the transmitter(s) 314, receiving and measuring positioning signals using the receiver(s) 312, and processing the measurements using the processor(s) 332.

In the first positioning mode, performing a positioning operation comprises receiving a first positioning signal from a first transmission/reception point (TRP) identified by the configuration information, sending a second positioning signal to the first TRP, and reporting, to the first entity, a time delay between receiving the first positioning signal and sending the second positioning signal. In the second positioning mode, performing a positioning operation comprises receiving a first positioning signal from the first TRP identified by the configuration information, transmitting a second positioning signal to a second TRP identified by the configuration information, and reporting, to the first entity, a time delay between receiving the first positioning signal and sending the second positioning signal. In some aspects, at least one of the first TRP and the second TRP comprises a base station or a positioning peer UE. Thus, different positioning modes may involve transmission of different types of reference signals, performing different delay measurements, and reporting different delays.

In some aspects, the first entity determines, based on the first information from the UE, that the UE should be changed to what may be referred to as an uplink (UL) power-limited positioning mode, i.e., a positioning mode in which the number and/or power of uplink or sidelink positioning signal transmissions by the UE is minimized. The second positioning mode described above is one example of such an UL power-limited positioning mode. In some aspects, the first entity determines, based on the first information from the UE, that the UE can exit an UL power-limited positioning mode and return to a non-UL-power-limited positioning mode, such as the first positioning mode described above.

In some aspects, the selected positioning mode comprises the first positioning mode. In some aspects, the first TRP comprises a base station, the first positioning signal comprises a downlink positioning reference signal (DL-PRS), and the second positioning signal comprises an uplink sounding reference signal (UL-SRS). In some aspects, the first TRP comprises a positioning peer UE, the first positioning signal comprises a first sidelink positioning reference signal (SL-PRS), and the second positioning signal comprises a second SL-PRS.

In some aspects, the selected positioning mode comprises the second positioning mode. In some aspects, the first TRP comprises a base station, the first positioning signal comprises a downlink positioning reference signal (DL-PRS), the second TRP comprises a base station, and the second positioning signal comprises an uplink sounding reference signal (UL-SRS). In some aspects, the first TRP comprises a first positioning peer UE, the first positioning signal comprises a first sidelink positioning reference signal (SL-PRS), the second TRP comprises a second positioning peer UE, and the second positioning signal comprises a second SL-PRS. In some aspects, the second positioning peer UE comprises a primary positioning peer UE. In some aspects, the primary positioning peer UE comprises a positioning-peer UE with a highest reference signal received power (RSRP), a best quality of location estimation, a least amount of mobility, or a combination thereof, compared to other positioning peer UEs with which the UE is communicating via sidelink communications. In some aspects, the primary positioning peer UE comprises a UE configured as a relay UE.

In some aspects, the first information further identifies a set of one or more TRP for which the UE measures pathloss reference signals, spatial transmit beam reference signals, or both. In some aspects, the first information indicates a start time, an end time, a duration, a periodicity, an offset, or a combination thereof, during which the maximum number of positioning signal transmissions or the maximum power for positioning signal transmissions that the UE can support will apply.

Process 1600 may include additional implementations, such as any single implementation or any combination of implementations described below and/or in connection with one or more other processes described elsewhere herein. Although FIG. 16 shows example blocks of process 1600, in some implementations, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a flowchart of an example process 1700 for wireless positioning according to some aspects of the disclosure. In some implementations, one or more process blocks of FIG. 17 may be performed by a positioning entity (e.g., location server 172, primary/relay UE 104B). In some implementations, one or more process blocks of FIG. 17 may be performed by another device or group of devices separate from or including the positioning entity. Additionally, or alternatively, one or more process blocks of FIG. 17 may be performed by one or more components of an apparatus, such as a processor(s), memory, or transceiver(s), any or all of which may be means for performing the operations of process 1700.

As shown in FIG. 17, process 1700 may include receiving, from a first user equipment (UE), first information indicating a maximum number of positioning signal transmissions or a maximum power for positioning signal transmissions that the first UE can support (block 1710). Means for performing the operation of block 1710 may include the transceiver(s) of any of the apparatuses described herein. For example, a location server 172 may receive the first information using its receiver(s).

As further shown in FIG. 17, process 1700 may include selecting, from a first positioning mode and a second positioning mode and based on the first information, a selected positioning mode for the first UE (block 1720). Means for performing the operation of block 1720 may include the processor(s), memory, or transceiver(s) of any of the apparatuses described herein. For example, the location server 172 may use processor(s) to select positioning mode from a pair of positioning modes stored in a memory.

As further shown in FIG. 17, process 1700 may include selecting at least one neighboring TRP to be involved in the selected positioning node (block 1730). Means for performing the operation of block 1730 may include the processor(s), memory, or transceiver(s) of any of the apparatuses described herein. For example, the location server 172 may use processor(s) to select the one or more neighboring TRPs.

As further shown in FIG. 17, process 1700 may include sending, to the first UE, configuration information for changing to the selected positioning mode, the configuration information identifying the at least one neighboring TRP (block 1740). Means for performing the operation of block 1740 may include the processor(s), memory, or transceiver(s) of any of the apparatuses described herein. For example, the positioning entity may send the configuration information using its transmitter(s).

In some implementations, in the first positioning mode, the first UE performs a positioning operation comprising receiving a first positioning signal from a first TRP identified by the configuration information, sending a second positioning signal to the first TRP, and reporting, to the positioning entity, a time delay between receiving the first positioning signal and sending the second positioning signal.

In some implementations, in the second positioning mode, the first UE performs a positioning operation comprising receiving a first positioning signal from the first TRP identified by the configuration information, transmitting a second positioning signal to a second TRP identified by the configuration information, and reporting, to the positioning entity, a time delay between receiving the first positioning signal and sending the second positioning signal.

In some aspects, the positioning entity comprises a location server. In some aspects, at least one of the positioning signal transmissions that the first UE can support comprises a sounding reference signal (SRS). In some aspects, selecting the at least one neighboring TRP comprises selecting at least one neighboring base station. In some aspects, selecting the at least one neighboring TRP to be involved in the selected positioning mode comprises sending, to a serving base station that is serving the first UE, a request for an updated sounding reference signal (SRS) configuration for the selected positioning mode, receiving, from the serving base station, the updated SRS configuration for the selected positioning mode, and selecting the at least one neighboring TRP based at least in part on the updated SRS configuration for the selected positioning mode.

In some aspects, the positioning entity comprises a positioning peer UE. In some aspects, at least one of the positioning signal transmissions that the first UE can support comprises a sidelink positioning reference signal (SL-PRS). In some aspects, selecting the at least one neighboring TRP comprises selecting at least one neighboring positioning peer UE. In some aspects, selecting the at least one neighboring positioning peer UE comprises identifying at least one neighboring positioning peer UE as being unable to receive a positioning signal transmission from the first UE operating in the selected positioning mode.

In some aspects, the first information further identifies a set of one or more recommended transmission/reception points (TRPs). In some aspects, selecting the at least one neighboring TRP comprises selecting at least one TRP from the set of one or more recommended TRPs. In some aspects, selecting the at least one neighboring TRP comprises excluding neighboring TRPs that are unable to successfully receive positioning signal transmissions from the first UE.

In some aspects, process 1700 further includes instructing the at least one neighboring TRP to stop measuring positioning signal transmissions from the first UE, and instructing a serving node that is serving the first UE to start measuring positioning reference signals from the at least one TRP and to start reporting, to the positioning entity, a set of measurements comprising at least one time delay between receiving a PRS from the at least one TRP and receiving the second positioning signal from the first UE. In some aspects, process 1700 further includes receiving, from the serving node, an acknowledgement that it will report the set of measurements to the LS. In some aspects, process 1700 further includes receiving the set of measurements from the serving node, and estimating a position of the first UE based on the set of measurements.

Process 1700 may include additional implementations, such as any single implementation or any combination of implementations described below and/or in connection with one or more other processes described elsewhere herein. Although FIG. 17 shows example blocks of process 1700, in some implementations, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
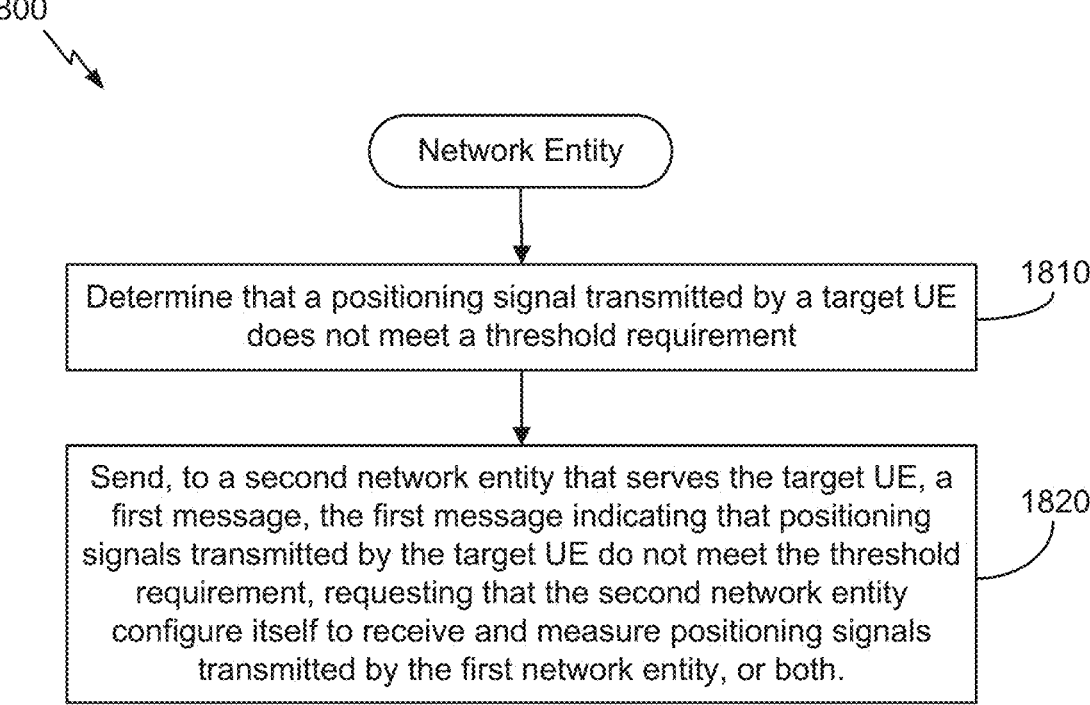

FIG. 18 is a flowchart of an example process 1800 for wireless positioning according to some aspects of the disclosure. In some implementations, one or more process blocks of FIG. 18 may be performed by a first network entity. In some aspects, the first network entity may comprise a base station (e.g., BS 304), or a network node (e.g., location server 172). In some implementations, one or more process blocks of FIG. 18 may be performed by another device or group of devices separate from or including the first network entity. Additionally, or alternatively, one or more process blocks of FIG. 18 may be performed by one or more components of network entity 306, such as processor(s) 394, memory 396, network transceiver(s) 390, and positioning module(s) 398, any or all of which may be means for performing the operations of process 1800.

As shown in FIG. 18, process 1800 may include determining that a positioning signal transmitted by a target UE does not meet a threshold requirement (block 1810). Means for performing the operation of block 1810 may include the processor(s) 394, memory 396, or network transceiver(s) 390 of the network entity 306. For example, the processor(s) 384 of base station 304 or the processor(s) 394 of the network entity 306 may make the determination that a positioning signal transmitted by a target UE does not meet a threshold requirement.

As further shown in FIG. 18, process 1800 may include sending, to a second network entity that serves the target UE, a first message, wherein the first message indicates that positioning signals transmitted by the target UE do not meet the threshold requirement, requests the second network entity to configure itself to receive and measure positioning signals transmitted by the first network entity, or both (block 1820). Means for performing the operation of block 1820 may include the processor(s) 384 and WWAN transceiver(s) 350 of base station 304, or the processor(s) 394, and network transceiver(s) 390 of the network entity 306. For example, the base station 304 may send the first message using the transmitter(s) 354, and the network entity 306 may send the first message using the network transceiver(s) 390.

In some aspects, the first network entity comprises a non-serving base station, the second network entity comprises a serving base station or a location server, the positioning signals transmitted by the target UE comprise uplink sounding reference signals, and the positioning signals transmitted by the first network entity comprise downlink positioning reference signals.

In some aspects, the first network entity comprises a positioning peer UE, the second network entity comprises a primary positioning UE or a relay UE, the positioning signals transmitted by the target UE comprise sidelink positioning reference signals, and the positioning signals transmitted by the first network entity comprise sidelink positioning reference signals.

In some aspects, process 1800 includes receiving, from the second network entity, an indication that the first network entity should stop measuring positioning signals from the target UE.

Process 1800 may include additional implementations, such as any single implementation or any combination of implementations described below and/or in connection with one or more other processes described elsewhere herein. Although FIG. 18 shows example blocks of process 1800, in some implementations, process 1800 may include additional blocks, fewer blocks, different blocks, or differently arranged blocks than those depicted in FIG. 18. Additionally, or alternatively, two or more of the blocks of process 1800 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), the method comprising: sending, to a first entity, first information indicating a maximum number of positioning signal transmissions that the UE can support, a maximum power for positioning signal transmissions that the UE can support, or both; receiving, from the first entity, configuration information for changing a positioning mode of the UE to a selected positioning mode selected from a first positioning mode and a second positioning mode; and performing a positioning operation according to the selected positioning mode, wherein in the first positioning mode, performing the positioning operation comprises receiving a first positioning signal from a first transmission/reception point (TRP) identified by the configuration information, sending a second positioning signal to the first TRP, and reporting, to the first entity, a time delay between receiving the first positioning signal and sending the second positioning signal, and wherein in the second positioning mode, performing the positioning operation comprises receiving the first positioning signal from the first TRP identified by the configuration information, sending a second positioning signal to a second TRP identified by the configuration information, and reporting, to the first entity, the time delay between receiving the first positioning signal and sending the second positioning signal.

Clause 2. The method of clause 1, wherein the first entity comprises a location server, a serving base station, or a primary or relay positioning peer UE.

Clause 3. The method of any of clauses 1 to 2, wherein at least one of the first TRP and the second TRP comprises a base station or a positioning peer UE.

Clause 4. The method of any of clauses 1 to 3, wherein the selected positioning mode comprises the first positioning mode.

Clause 5. The method of clause 4, wherein the first TRP comprises a base station, the first positioning signal comprises a downlink positioning reference signal (DL-PRS), and the second positioning signal comprises an uplink sounding reference signal (UL-SRS).

Clause 6. The method of any of clauses 4 to 5, wherein the first TRP comprises a positioning peer UE, the first positioning signal comprises a first sidelink positioning reference signal (SL-PRS), and the second positioning signal comprises a second SL-PRS.

Clause 7. The method of any of clauses 1 to 6, wherein the selected positioning mode comprises the second positioning mode.

Clause 8. The method of clause 7, wherein the first TRP comprises a first base station, the first positioning signal comprises a downlink positioning reference signal (DL-PRS), the second TRP comprises a second base station, and the second positioning signal comprises an uplink sounding reference signal (UL-SRS).

Clause 9. The method of any of clauses 7 to 8, wherein the first TRP comprises a first positioning peer UE, the first positioning signal comprises a first sidelink positioning reference signal (SL-PRS), the second TRP comprises a second positioning peer UE, and the second positioning signal comprises a second SL-PRS.

Clause 10. The method of any of clauses 1 to 9, wherein the first information further identifies a set of one or more TRP for which the UE measures pathloss reference signals, spatial transmit beam reference signals, or both.

Clause 11. The method of any of clauses 1 to 10, wherein the first information indicates a start time, an end time, a duration, a periodicity, an offset, or a combination thereof, during which the maximum number of positioning signal transmissions that the UE can support or the maximum power for positioning signal transmissions that the UE can support will apply.

Clause 12. A method of wireless positioning performed by a positioning entity, the method comprising: receiving, from a first user equipment (UE), first information indicating a maximum number of positioning signal transmissions that the first UE can support, a maximum power for positioning signal transmissions that the first UE can support, or both;

selecting, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal; selecting at least one neighboring TRP to be involved in the selected positioning mode as at least the first TRP; and sending, to the first UE, configuration information for changing a positioning mode of the UE to the selected positioning mode, the configuration information identifying the at least one neighboring TRP.

Clause 13. The method of clause 12, wherein the positioning entity comprises a location server or a positioning peer UE.

Clause 14. The method of clause 13, wherein at least one of the positioning signal transmissions that the first UE can support comprises a sounding reference signal (SRS) or a sidelink positioning reference signal (SL-PRS).

Clause 15. The method of any of clauses 13 to 14, wherein selecting the at least one neighboring TRP comprises selecting at least one neighboring base station or positioning peer UE.

Clause 16. The method of any of clauses 13 to 15, wherein selecting the at least one neighboring TRP to be involved in the selected positioning mode comprises: sending, to a serving base station that is serving the first UE, a request for an updated sounding reference signal (SRS) configuration for the selected positioning mode; receiving, from the serving base station, an updated SRS configuration for the selected positioning mode; and selecting the at least one neighboring TRP based at least in part on the updated SRS configuration for the selected positioning mode.

Clause 17. The method of any of clauses 12 to 16, wherein the first information further identifies a set of one or more recommended TRPs and wherein selecting the at least one neighboring TRP comprises selecting at least one TRP from the set of one or more recommended TRPs.

Clause 18. The method of any of clauses 12 to 17, further comprising: instructing the at least one neighboring TRP to stop measuring positioning signal transmissions from the first UE; and instructing a serving node that is serving the first UE to start measuring positioning reference signals from the at least one TRP, and to start reporting, to the positioning entity, a set of measurements comprising at least one time delay between receiving a PRS from the at least one TRP and receiving the second positioning signal from the first UE.

Clause 19. The method of clause 18, further comprising: receiving the set of measurements from the serving node; and estimating a position of the first UE based on the set of measurements.

Clause 20. A method of wireless positioning performed by a first network entity, the method comprising: determining that a first positioning signal transmitted by a target UE does not meet a threshold requirement; and sending, to a second network entity that serves the target UE, a first message, wherein the first message indicates that positioning signals transmitted by the target UE do not meet the threshold requirement, requests the second network entity to configure itself to receive and measure positioning signals transmitted by the first network entity, or both.

Clause 21. The method of clause 20, wherein the first network entity comprises a non-serving base station, the second network entity comprises a serving base station or a location server, the positioning signals transmitted by the target UE comprise uplink sounding reference signals, and the positioning signals transmitted by the first network entity comprise downlink positioning reference signals.

Clause 22. The method of any of clauses 20 to 21, wherein the first network entity comprises a positioning peer UE, the second network entity comprises a primary positioning UE or a relay UE, the positioning signals transmitted by the target UE comprise sidelink positioning reference signals, and the positioning signals transmitted by the first network entity comprise sidelink positioning reference signals.

Clause 23. The method of any of clauses 20 to 22, further comprising: receiving, from the second network entity, an indication that the first network entity should stop measuring positioning signals from the target UE.

Clause 24. A user equipment (UE), comprising: a memory; at least one transceiver; and at least one processor communicatively coupled to the memory and the at least one transceiver, the at least one processor configured to: send, via the at least one transceiver, to a first entity, first information indicating a maximum number of positioning signal transmissions that the UE can support, a maximum power for positioning signal transmissions that the UE can support, or both; receive, via the at least one transceiver, from the first entity, configuration information for changing a positioning mode of the UE to a selected positioning mode selected from a first positioning mode and a second positioning mode; and perform a positioning operation according to the selected positioning mode, wherein in the first positioning mode, the at least one processor is configured to receive a first positioning signal from a first transmission/reception point (TRP) identified by the configuration information, send a second positioning signal to the first TRP, and report, to the first entity, a time delay between receiving the first positioning signal and sending the second positioning signal, and wherein in the second positioning mode, the at least one processor is configured to receive the first positioning signal from the first TRP identified by the configuration information, send a second positioning signal to a second TRP identified by the configuration information, and report, to the first entity, the time delay between receiving the first positioning signal and sending the second positioning signal.

Clause 25. The UE of clause 24, wherein the first entity comprises a location server, a serving base station, or a primary or relay positioning peer UE.

Clause 26. The UE of any of clauses 24 to 25, wherein at least one of the first TRP and the second TRP comprises a base station or a positioning peer UE.

Clause 27. The UE of any of clauses 24 to 26, wherein the selected positioning mode comprises the first positioning mode.

Clause 28. The UE of clause 27, wherein the first TRP comprises a base station, the first positioning signal comprises a downlink positioning reference signal (DL-PRS), and the second positioning signal comprises an uplink sounding reference signal (UL-SRS).

Clause 29. The UE of any of clauses 27 to 28, wherein the first TRP comprises a positioning peer UE, the first positioning signal comprises a first sidelink positioning reference signal (SL-PRS), and the second positioning signal comprises a second SL-PRS.

Clause 30. The UE of any of clauses 24 to 29, wherein the selected positioning mode comprises the second positioning mode.

Clause 31. The UE of clause 30, wherein the first TRP comprises a first base station, the first positioning signal comprises a downlink positioning reference signal (DL-PRS), the second TRP comprises a second base station, and the second positioning signal comprises an uplink sounding reference signal (UL-SRS).

Clause 32. The UE of any of clauses 30 to 31, wherein the first TRP comprises a first positioning peer UE, the first positioning signal comprises a first sidelink positioning reference signal (SL-PRS), the second TRP comprises a second positioning peer UE, and the second positioning signal comprises a second SL-PRS.

Clause 33. The UE of any of clauses 24 to 32, wherein the first information further identifies a set of one or more TRP for which the UE measures pathloss reference signals, spatial transmit beam reference signals, or both.

Clause 34. The UE of any of clauses 24 to 33, wherein the first information indicates a start time, an end time, a duration, a periodicity, an offset, or a combination thereof, during which the maximum number of positioning signal transmissions that the UE can support or the maximum power for positioning signal transmissions that the UE can support will apply.

Clause 35. A positioning entity, comprising: a memory; at least one transceiver; and at least one processor communicatively coupled to the memory and the at least one transceiver, the at least one processor configured to: receive, via the at least one transceiver, from a first user equipment (UE), first information indicating a maximum number of positioning signal transmissions that the UE can support, a maximum power for positioning signal transmissions that the first UE can support, or both; select, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal; select at least one neighboring TRP to be involved in the selected positioning mode as at least the first TRP; and send, via the at least one transceiver, to the first UE, configuration information for changing a positioning mode of the UE to the selected positioning mode, the configuration information identifying the at least one neighboring TRP.

Clause 36. The positioning entity of clause 35, wherein the positioning entity comprises a location server or a positioning peer UE.

Clause 37. The positioning entity of clause 36, wherein at least one of the positioning signal transmissions that the first UE can support comprises a sounding reference signal (SRS) or a sidelink positioning reference signal (SL-PRS).

Clause 38. The positioning entity of any of clauses 36 to 37, wherein, to select the at least one neighboring TRP, the at least one processor is configured to select at least one neighboring base station or positioning peer UE.

Clause 39. The positioning entity of any of clauses 36 to 38, wherein, to select the at least one neighboring TRP to be involved in the selected positioning mode, the at least one processor is configured to: send, via the at least one transceiver, to a serving base station that is serving the first UE, a request for an updated sounding reference signal (SRS) configuration for the selected positioning mode; receive, via the at least one transceiver, from the serving base station, an updated SRS configuration for the selected positioning mode; and select the at least one neighboring TRP based at least in part on the updated SRS configuration for the selected positioning mode.

Clause 40. The positioning entity of any of clauses 35 to 39, wherein the first information further identifies a set of one or more recommended TRPs and wherein selecting the at least one neighboring TRP comprises selecting at least one TRP from the set of one or more recommended TRPs.

Clause 41. The positioning entity of any of clauses 35 to 40, wherein the at least one processor is further configured to: instruct the at least one neighboring TRP to stop measuring positioning signal transmissions from the first UE; and instruct a serving node that is serving the first UE to start measuring positioning reference signals from the at least one TRP, and to start reporting, to the positioning entity, a set of measurements comprising at least one time delay between receiving a PRS from the at least one TRP and receiving the second positioning signal from the first UE.

Clause 42. The positioning entity of clause 41, wherein the at least one processor is further configured to: receive, via the at least one transceiver, the set of measurements from the serving node; and estimate a position of the first UE based on the set of measurements.

Clause 43. A first network entity, comprising: a memory; at least one transceiver; and at least one processor communicatively coupled to the memory and the at least one transceiver, the at least one processor configured to: determine that a first positioning signal transmitted by a target UE does not meet a threshold requirement; and send, via the at least one transceiver, to a second network entity that serves the target UE, a first message, wherein the first message indicates that positioning signals transmitted by the target UE do not meet the threshold requirement, requests the second network entity to configure itself to receive and measure positioning signals transmitted by the first network entity, or both.

Clause 44. The first network entity of clause 43, wherein the first network entity comprises a non-serving base station, the second network entity comprises a serving base station or a location server, the positioning signals transmitted by the target UE comprise uplink sounding reference signals, and the positioning signals transmitted by the first network entity comprise downlink positioning reference signals.

Clause 45. The first network entity of any of clauses 43 to 44, wherein the first network entity comprises a positioning peer UE, the second network entity comprises a primary positioning UE or a relay UE, the positioning signals transmitted by the target UE comprise sidelink positioning reference signals, and the positioning signals transmitted by the first network entity comprise sidelink positioning reference signals.

Clause 46. The first network entity of any of clauses 43 to 45, wherein the at least one processor is further configured to: receive, via the at least one transceiver, from the second network entity, an indication that the first network entity should stop measuring positioning signals from the target UE.

Clause 47. An apparatus comprising a memory, a transceiver, and a processor communicatively coupled to the memory and the transceiver, the memory, the transceiver, and the processor configured to perform a method according to any of clauses 1 to 23.

Clause 48. An apparatus comprising means for performing a method according to any of clauses 1 to 23.

Clause 49. A non-transitory computer-readable medium storing computer-executable instructions, the computer-executable comprising at least one instruction for causing a computer or processor to perform a method according to any of clauses 1 to 23.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), the method comprising:

sending, to a first entity, first information indicating a maximum number of positioning signal transmissions that the UE can support, a maximum power for positioning signal transmissions that the UE can support, or both;

receiving, from the first entity, configuration information for changing a positioning mode of the UE to a selected positioning mode selected from a first positioning mode and a second positioning mode; and performing a positioning operation according to the selected positioning mode, wherein in the first positioning mode, performing the positioning operation comprises receiving a first positioning signal from a first transmission/reception point (TRP) identified by the configuration information, sending a second positioning signal to the first TRP, and reporting, to the first entity, a time delay between receiving the first positioning signal and sending the second positioning signal, and wherein in the second positioning mode, performing the positioning operation comprises receiving the first positioning signal from the first TRP identified by the configuration information, sending a second positioning signal to a second TRP identified by the configuration information, and reporting, to the first entity, the time delay between receiving the first positioning signal and sending the second positioning signal.

2. The method of claim 1, wherein the first entity comprises a location server, a serving base station, or a primary or relay positioning peer UE.

3. The method of claim 1, wherein at least one of the first TRP and the second TRP comprises a base station or a positioning peer UE.

4. The method of claim 1, wherein the selected positioning mode comprises the first positioning mode.

5. The method of claim 4, wherein the first TRP comprises a base station, the first positioning signal comprises a downlink positioning reference signal (DL-PRS), and the second positioning signal comprises an uplink sounding reference signal (UL-SRS).

6. The method of claim 4, wherein the first TRP comprises a positioning peer UE, the first positioning signal comprises a first sidelink positioning reference signal (SL-PRS), and the second positioning signal comprises a second SL-PRS.

7. The method of claim 1, wherein the selected positioning mode comprises the second positioning mode.

8. The method of claim 7, wherein the first TRP comprises a first base station, the first positioning signal comprises a downlink positioning reference signal (DL-PRS), the second TRP comprises a second base station, and the second positioning signal comprises an uplink sounding reference signal (UL-SRS).

9. The method of claim 7, wherein the first TRP comprises a first positioning peer UE, the first positioning signal comprises a first sidelink positioning reference signal (SL-PRS), the second TRP comprises a second positioning peer UE, and the second positioning signal comprises a second SL-PRS.

10. The method of claim 1, wherein the first information further identifies a set of one or more TRP for which the UE measures pathloss reference signals, spatial transmit beam reference signals, or both.

11. The method of claim 1, wherein the first information indicates a start time, an end time, a duration, a periodicity, an offset, or a combination thereof, during which the maximum number of positioning signal transmissions that the UE can support or the maximum power for positioning signal transmissions that the UE can support will apply.

12. A method of wireless positioning performed by a positioning entity, the method comprising:

receiving, from a first user equipment (UE), first information indicating a maximum number of positioning signal transmissions that the first UE can support, a maximum power for positioning signal transmissions that the first UE can support, or both;

selecting, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal;

selecting at least one neighboring TRP to be involved in the selected positioning mode as at least the first TRP; and sending, to the first UE, configuration information for changing a positioning mode of the UE to the selected positioning mode, the configuration information identifying the at least one neighboring TRP.

13. The method of claim 12, wherein the positioning entity comprises a location server or a positioning peer UE.

14. The method of claim 13, wherein at least one of the positioning signal transmissions that the first UE can support comprises a sounding reference signal (SRS) or a sidelink positioning reference signal (SL-PRS).

15. The method of claim 13, wherein selecting the at least one neighboring TRP comprises selecting at least one neighboring base station or positioning peer UE.

16. The method of claim 13, wherein selecting the at least one neighboring TRP to be involved in the selected positioning mode comprises:

sending, to a serving base station that is serving the first UE, a request for an updated sounding reference signal (SRS) configuration for the selected positioning mode;

receiving, from the serving base station, an updated SRS configuration for the selected positioning mode; and selecting the at least one neighboring TRP based at least in part on the updated SRS configuration for the selected positioning mode.

17. The method of claim 12, wherein the first information further identifies a set of one or more recommended TRPs and wherein selecting the at least one neighboring TRP comprises selecting at least one TRP from the set of one or more recommended TRPs.

18. The method of claim 12, further comprising:

instructing the at least one neighboring TRP to stop measuring positioning signal transmissions from the first UE; and instructing a serving node that is serving the first UE to start measuring positioning reference signals from the at least one TRP, and to start reporting, to the positioning entity, a set of measurements comprising at least one time delay between receiving a PRS from the at least one TRP and receiving the second positioning signal from the first UE.

19. The method of claim 18, further comprising:

receiving the set of measurements from the serving node; and estimating a position of the first UE based on the set of measurements.

20. A user equipment (UE), comprising:

a memory;

at least one transceiver; and at least one processor communicatively coupled to the memory and the at least one transceiver, the at least one processor configured to:

send, via the at least one transceiver, to a first entity, first information indicating a maximum number of positioning signal transmissions that the UE can support, a maximum power for positioning signal transmissions that the UE can support, or both;

receive, via the at least one transceiver, from the first entity, configuration information for changing a positioning mode of the UE to a selected positioning mode selected from a first positioning mode and a second positioning mode; and perform a positioning operation according to the selected positioning mode, wherein in the first positioning mode, the at least one processor is configured to receive a first positioning signal from a first transmission/reception point (TRP) identified by the configuration information, send a second positioning signal to the first TRP, and report, to the first entity, a time delay between receiving the first positioning signal and sending the second positioning signal, and wherein in the second positioning mode, the at least one processor is configured to receive the first positioning signal from the first TRP identified by the configuration information, send a second positioning signal to a second TRP identified by the configuration information, and report, to the first entity, the time delay between receiving the first positioning signal and sending the second positioning signal.

21. The UE of claim 20, wherein the first entity comprises a location server, a serving base station, or a primary or relay positioning peer UE.

22. The UE of claim 20, wherein at least one of the first TRP and the second TRP comprises a base station or a positioning peer UE.

23. The UE of claim 20, wherein the selected positioning mode comprises the first positioning mode.

24. The UE of claim 23, wherein the first TRP comprises a base station, the first positioning signal comprises a downlink positioning reference signal (DL-PRS), and the second positioning signal comprises an uplink sounding reference signal (UL-SRS).

25. The UE of claim 23, wherein the first TRP comprises a positioning peer UE, the first positioning signal comprises a first sidelink positioning reference signal (SL-PRS), and the second positioning signal comprises a second SL-PRS.

26. The UE of claim 20, wherein the selected positioning mode comprises the second positioning mode.

27. The UE of claim 26, wherein the first TRP comprises a first base station, the first positioning signal comprises a downlink positioning reference signal (DL-PRS), the second TRP comprises a second base station, and the second positioning signal comprises an uplink sounding reference signal (UL-SRS).

28. The UE of claim 26, wherein the first TRP comprises a first positioning peer UE, the first positioning signal comprises a first sidelink positioning reference signal (SL-PRS), the second TRP comprises a second positioning peer UE, and the second positioning signal comprises a second SL-PRS.

29. The UE of claim 20, wherein the first information further identifies a set of one or more TRP for which the UE measures pathloss reference signals, spatial transmit beam reference signals, or both.

30. The UE of claim 20, wherein the first information indicates a start time, an end time, a duration, a periodicity, an offset, or a combination thereof, during which the maximum number of positioning signal transmissions that the UE can support or the maximum power for positioning signal transmissions that the UE can support will apply.

31. A positioning entity, comprising:

a memory;

at least one transceiver; and at least one processor communicatively coupled to the memory and the at least one transceiver, the at least one processor configured to:

receive, via the at least one transceiver, from a first user equipment (UE), first information indicating a maximum number of positioning signal transmissions that the UE can support, a maximum power for positioning signal transmissions that the first UE can support, or both;

select, based on the first information, a positioning mode for the first UE, wherein the selected positioning mode is selected from a first positioning mode, in which the UE is configured to receive a first positioning signal from a first transmission/reception point (TRP), to send a second positioning signal to the first TRP, and to report, to the positioning entity, a time delay between receiving the first positioning signal and the second positioning signal, and a second positioning mode, in which the UE is configured to receive the first positioning signal from the first TRP, to send a second positioning signal to a second TRP, and to report, to the positioning entity, the time delay between receiving the first positioning signal and sending the second positioning signal;

select at least one neighboring TRP to be involved in the selected positioning mode as at least the first TRP; and send, via the at least one transceiver, to the first UE, configuration information for changing a positioning mode of the UE to the selected positioning mode, the configuration information identifying the at least one neighboring TRP.

32. The positioning entity of claim 31, wherein the positioning entity comprises a location server or a positioning peer UE.

33. The positioning entity of claim 32, wherein at least one of the positioning signal transmissions that the first UE can support comprises a sounding reference signal (SRS) or a sidelink positioning reference signal (SL-PRS).

34. The positioning entity of claim 32, wherein, to select the at least one neighboring TRP, the at least one processor is configured to select at least one neighboring base station or positioning peer UE.

35. The positioning entity of claim 32, wherein, to select the at least one neighboring TRP to be involved in the selected positioning mode, the at least one processor is configured to:

send, via the at least one transceiver, to a serving base station that is serving the first UE, a request for an updated sounding reference signal (SRS) configuration for the selected positioning mode;

receive, via the at least one transceiver, from the serving base station, an updated SRS configuration for the selected positioning mode; and select the at least one neighboring TRP based at least in part on the updated SRS configuration for the selected positioning mode.

36. The positioning entity of claim 31, wherein the first information further identifies a set of one or more recommended TRPs and wherein selecting the at least one neighboring TRP comprises selecting at least one TRP from the set of one or more recommended TRPs.

37. The positioning entity of claim 31, wherein the at least one processor is further configured to:

instruct the at least one neighboring TRP to stop measuring positioning signal transmissions from the first UE; and instruct a serving node that is serving the first UE to start measuring positioning reference signals from the at least one TRP, and to start reporting, to the positioning entity, a set of measurements comprising at least one time delay between receiving a PRS from the at least one TRP and receiving the second positioning signal from the first UE.

38. The positioning entity of claim 37, wherein the at least one processor is further configured to:

receive, via the at least one transceiver, the set of measurements from the serving node; and estimate a position of the first UE based on the set of measurements.

* * * * *